United States Patent [19]
Ha et al.

[11] Patent Number: 5,839,357
[45] Date of Patent: Nov. 24, 1998

[54] ELECTRIC PRESSURE COOKER

[75] Inventors: Dong-Kyu Ha; In-Hwan Joo, both of Suwon, Rep. of Korea

[73] Assignee: Samsung Electronics Co., Ltd., Kyungki-do, Rep. of Korea

[21] Appl. No.: 818,343

[22] Filed: Mar. 14, 1997

[30] Foreign Application Priority Data

| Mar. 15, 1996 | [KR] | Rep. of Korea | 96-7044 |
| Apr. 12, 1996 | [KR] | Rep. of Korea | 96-11007 |
| Jul. 18, 1996 | [KR] | Rep. of Korea | 96-29402 |
| Aug. 2, 1996 | [KR] | Rep. of Korea | 96-32390 |

[51] Int. Cl.$^6$ .............. A47J 27/00; A47J 27/08; A47J 27/09; A23L 3/00
[52] U.S. Cl. .............. 99/337; 99/330; 99/341; 99/403; 99/492; 219/401; 219/496; 220/316; 220/912
[58] Field of Search ............. 99/325–333, 337–340, 99/341, 403–418, 468, 492; 126/369, 374, 388; 219/411, 431, 686, 432, 492, 496, 401, 440, 494; 220/314, 316, 333, 211, 335, 325, 378, 203.07, 912

[56] References Cited

U.S. PATENT DOCUMENTS

| 3,976,218 | 8/1976 | Stoermer | 99/403 X |
| 4,238,996 | 12/1980 | Okuyama | 126/369 X |
| 4,273,991 | 6/1981 | Barnhill | 219/440 |
| 4,324,344 | 4/1982 | Kunz | 220/314 X |
| 4,430,557 | 2/1984 | Eichelberger et al. | 219/401 |
| 5,048,400 | 9/1991 | Ueda et al. | 99/332 |
| 5,072,095 | 12/1991 | Hoffmann | 219/492 X |
| 5,135,121 | 8/1992 | Javier | 220/316 X |
| 5,229,563 | 7/1993 | Isogai et al. | 99/330 X |
| 5,293,813 | 3/1994 | Schultz | 99/337 |
| 5,402,712 | 4/1995 | King et al. | 99/407 |
| 5,549,038 | 8/1996 | Kolvites | 99/330 |
| 5,613,424 | 3/1997 | Chameroy et al. | 99/337 |

*Primary Examiner*—Timothy F. Simone
*Attorney, Agent, or Firm*—Burns, Doane, Swecker & Mathis, L.L.P.

[57] ABSTRACT

Disclosed is an electric pressure cooker. The electric pressure cooker's food container is locked to its lid by using a driving power of a motor. The inner pressure state of the container can be monitored from the outside, and is automatically discharged when it exceeds a predetermined pressure.

28 Claims, 29 Drawing Sheets

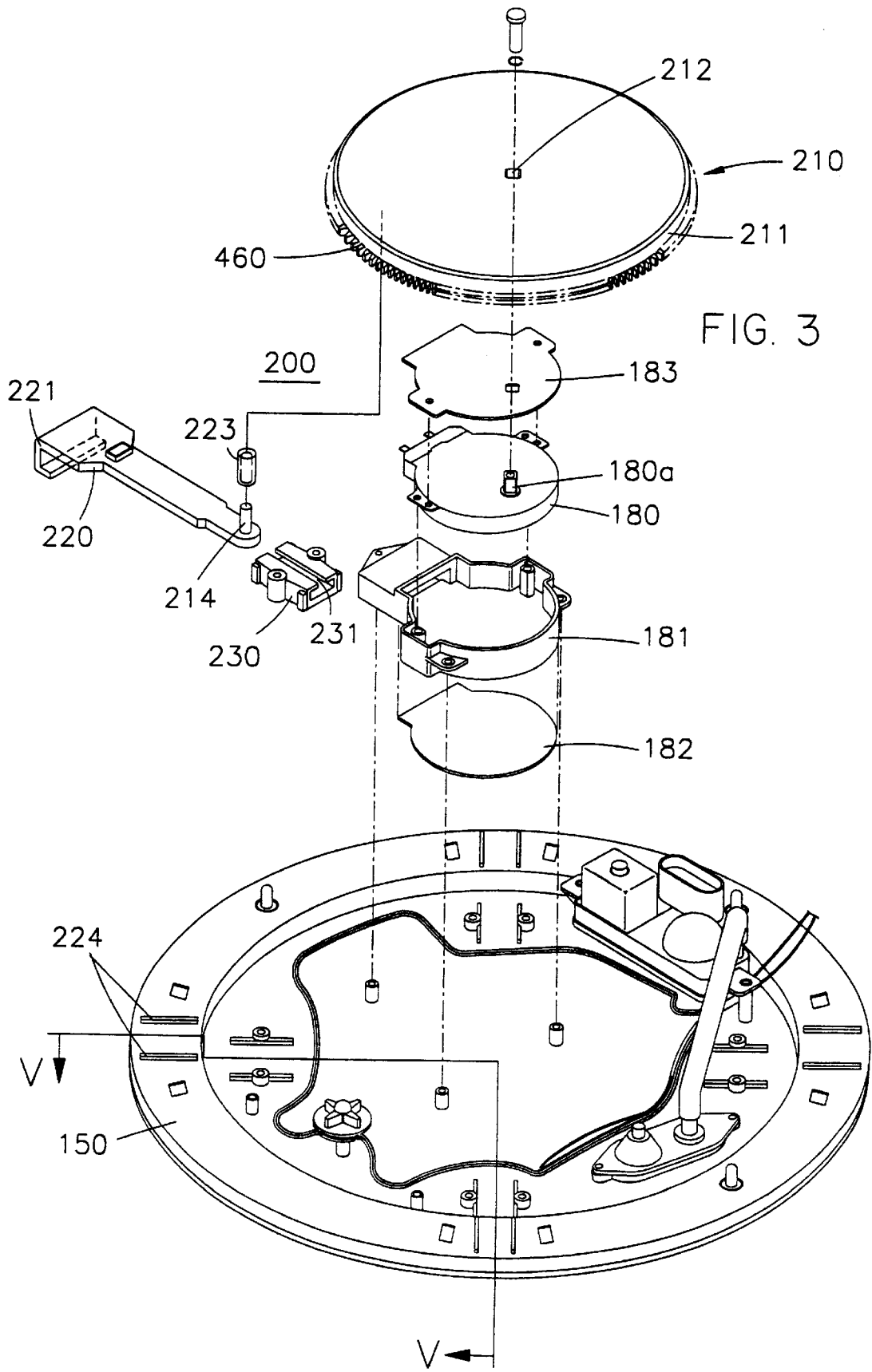

FIG. 13c
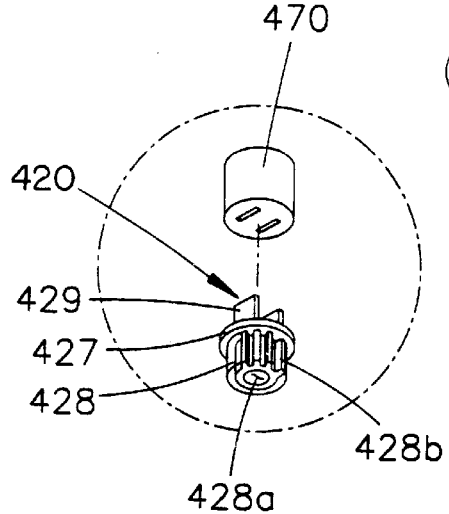
FIG. 13b
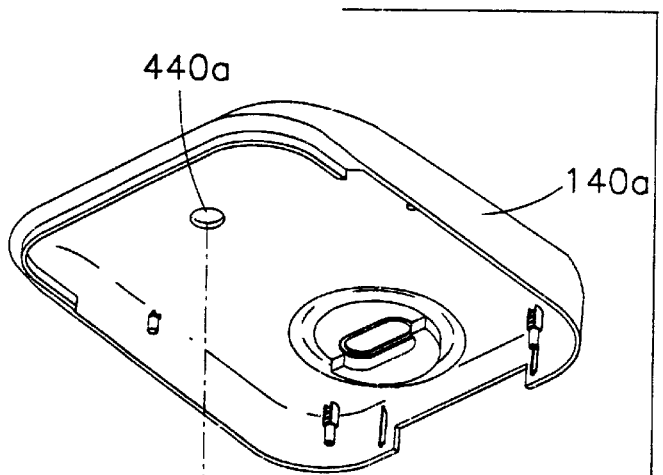
FIG. 13a
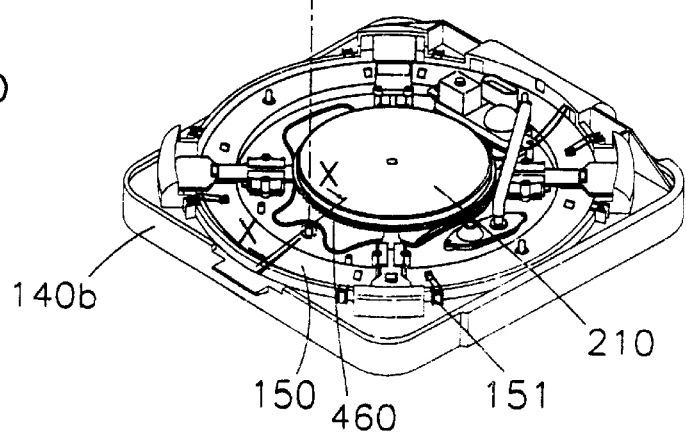

"A"

ELECTRIC PRESSURE COOKER

BACKGROUND OF THE INVENTION

(1) Field of the Invention

The present invention generally relates to an electric pressure cooker. More particularly, it relates to an electric pressure cooker which uses the driving power of a motor to lock both its food container and its lid thereby sealing the container. It then monitors its inner pressure state from the outside, and automatically discharges the steam generated during cooking when the inner pressure of the food container becomes higher than a predetermined pressure.

(2) Description of the Prior Art

Traditionally, in order to cook rice, the user had to put the rice into a food container, measure the amount of water to add, and provide heat to the food container. However, now, an electric rice cooker is used which includes a food container wherein a water level is indicated according to the amount of rice in its main body. It then cooks the rice using electricity. A pressure cooker which increases the inner pressure of the food container when cooking, thereby increasing the boiling point of water contained therein, has also been developed in addition to the electric rice cooker.

As the $\alpha$-ratio of the starchiness of rice becomes higher, the rice becomes more sweet. As the temperature of water increases, the $\alpha$-ratio of the starchiness of rice also increases. Therefore, increasing the pressure in the cooker to raise the boiling point of the water contained therein increases the $\alpha$-ratio of the starchiness above that attained by a standard rice cooker. Therefore, the rice has a more sweet taste.

To make a high inner pressure in the cooking container, it should be sealed, and the vapor should not leak from it during a cooking operation. Accordingly, the inside of the food container has a high pressure by the generated vapor.

A conventional electric pressure cooker described in Japanese Utility Model Laid-open No. Hei 4-36925 is shown in FIGS. 22 and 23. It comprises a main body 1, a lid 3, and an auxiliary lid 10 rotatably positioned on the bottom of the lid 3. When the food container 2 is placed into the main body 1 and the lid 3 is closed, teeth 9 projecting tangentially from the top circumference of the food container 2 are inserted into the space 16 between teeth projecting in the same manner from the circumference of the auxiliary lid 10. Next, the knob 15 is rotated thereby rotating the auxiliary lid 10 so that the auxiliary lid 10 is caught on the arm 9. In this way, the food container 2 and the auxiliary lid 10 are locked together or released from each other. And the vapor generated when cooking is discharged through a discharge valve 18.

However, in the conventional electric pressure cooker, the user must suffer the inconvenience of heating to manually lock and release the food container from the auxiliary lid. Also since the vapor pressure generated during cooking is still present after cooking has finished, the food container and the auxiliary lid are not easily released from each other.

Lastly, there is no safety apparatus for preventing the malfunction of the vapor discharge valve in the conventional electric pressure cooker.

SUMMARY OF THE INVENTION

Accordingly, the present invention is directed to an electric pressure cooker that substantially obviates the above problems caused by the limitations and disadvantages of the related art.

It is an objective of the present invention to provide an electric pressure cooker which automatically locks its food container and together using driving means such as a motor, thereby sealing the container.

It is a second objective of the present invention to provide an electric pressure cooker which has a means for sensing that the food container and lid being locked or released, and automatically controlling the driving of a motor to lock or release the food container and lid.

It is a third objective of the present invention to provide an electric pressure cooker which has a manual rotating means for manually manipulating the locking means, to thereby lock or release the food container and lid in the event that the motor is not driven.

It is a fourth objective of the present invention to provide an electric pressure cooker which allows the user to monitor from outside the pressure inside the food container.

It is a fifth objective of the present invention to provide an electric pressure cooker which, as a safeguard, automatically discharges the inner vapor of the rice container when the inner pressure of the food container becomes higher than a predetermined pressure.

In order to achieve these objectives and others, the inventive electric pressure cooker includes: a cooker body which holds a food container; a lid for opening/closing the entrance to container; locking means which locks the lid to and releases it from the container; and driving means for driving the locking means.

In addition, the electric pressure cooker includes: a food container having food; a lid for opening/closing the container; an auxiliary lid which is mounted to the lid and rises according to the inner pressure of the container; and pressure display means which is elevated together with the auxiliary lid, through which the user is able to monitor from outside the inner pressure of the container.

In addition, the electric pressure cooker includes: a food container having food; a lid for opening/closing the container s sealing member, which is mounted to the lid where it would contact the room of the container, that prevents the leakage of vapor during cooking; and safety means mounted to the sealing member that automatically discharges the inner vapor in the food container if the pressure in the food container becomes higher than a predetermined pressure.

In addition, the electric pressure cooker includes: a food container having food; a lid for opening/closing the container; an auxiliary lid which is mounted to the lid; a sealing member which is mounted to the auxiliary lid contacted with the container, and prevents a leakage vapor when cooking; an engaging member which locks the auxiliary lid to the container, and is raised together with the auxiliary lid by the pressure in the container; a vapor discharge means which discharges vapor so as to maintain a predetermined pressure inside the food container by the vapor generated during cooking; and safety means provided to the engaging means that prevents the auxiliary lid from rising when the inner pressure of the food container is between two pressures, but allows it to rise when the inner pressure is higher than both of the predetermined pressures, and thereby discharging the vapor through the resulting gap formed between the food container and the auxiliary lid and enlarging the inner volume of the container.

BREIF DESCRIPTION OF THE DRAWINGS

FIG. 3 is an exploded perspective view illustrating a locking means in accordance with the present invention;

FIGS. 13a –13c is a perspective view illustrating a second preferred embodiment of a manual rotating means and a pressure display means in accordance with the present invention;

DETAILED DESCRIPTION OF THE PREFFERED EMBODIMENTS

The preferred embodiments of the present invention will become apparent from a study of the following detailed description, when viewed in light of the accompanying drawings.

Figure 1:
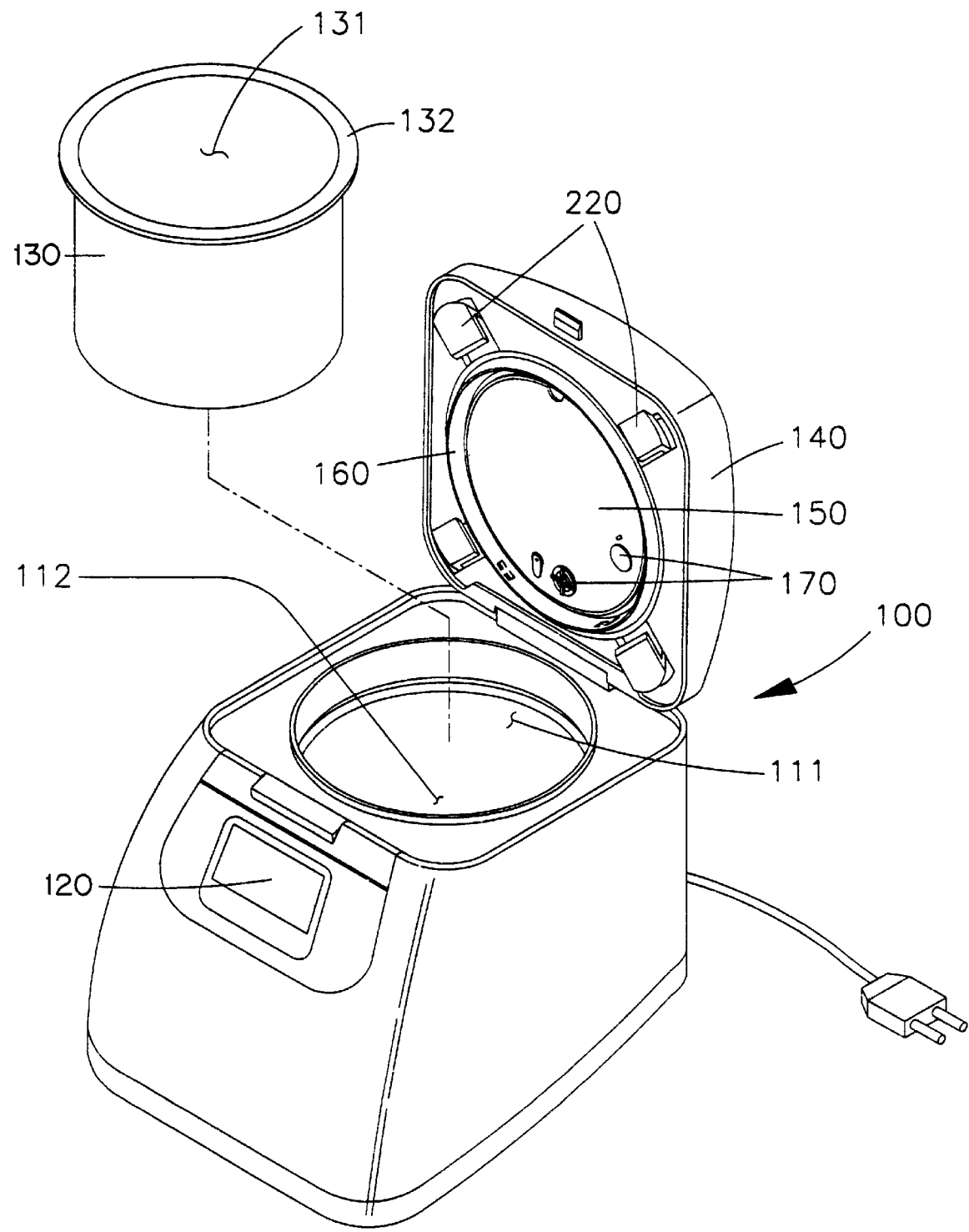
FIG. 1 is a perspective view illustrating an electric pressure cooker in accordance with the present invention.

As shown in FIG. 1, an electric pressure cooker according to the present invention includes a main body 100 with an opening portion 111 and a hollow portion 112. A controller 120 connected to a manipulation switch is provided to the front of the main body 100. The hollow portion 112 includes a food container 130 with an opening portion 131 through which food to be cooked is placed into the container. The top of the food containerhas an outward-protruding rim 132 to which an engaging member 220 which performs a rectilinear reciprocating motion, is coupled. A lid 140 for sealing the main body 100 and the food container 130 is rotatably connected to the opening portion 111 of the main body 100 by a hinge shaft. An auxiliary lid 150 is mounted on the bottom of the lid 140. When the lid 140 covers the opening portion 111, the auxiliary lid 150 contacts the rim 132 of the food container 130, thereby further sealing the food container 130. A sealing member 160, which is provided around the rim of the auxiliary lid 150, prevents vapor from leaking out between the food container 130 and the auxiliary lid 150. The reference numeral 170 is a vapor discharging device.

Figure 2:
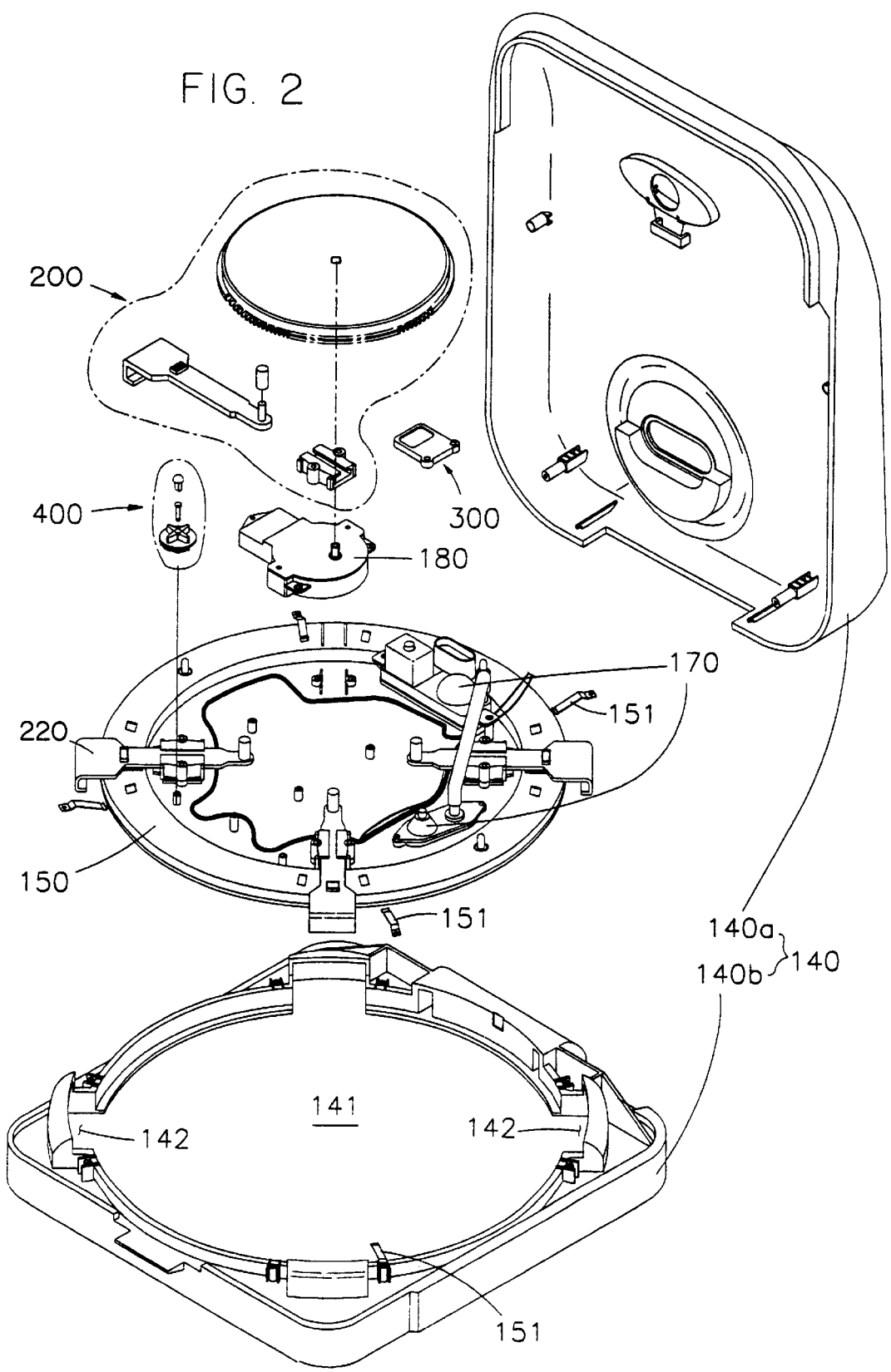
FIG. 2 is an exploded perspective view illustrating the lid of an electric pressure cooker in accordance with the present invention.

FIG. 2 is an exploded perspective view illustrating the lid of an electric pressure cooker in accordance with the present invention.

The lid 140 comprises an upper lid 140a and a lower lid 140b. A mounting opening 141 is formed in the lower lid 140b. The mounting opening 141 is formed to not move when the auxiliary lid 150 is connected to the lower lid 140b. The auxiliary lid 150 is connected to the lower lid 140b by a plate spring 151. A recess 142, which allows air to be in continual communication with the mounting opening 141 is formed in each corner of the lower lid 140b. One end of the engaging member 220 is positioned to fit into the recess 142, so that the engaging member 220 accurately performs its rectilinear reciprocating motion. The rectilinear reciprocating motion will be more specifically described below.

The electric pressure cooker according to the present invention is locked by a locking means 200 so that the vapor pressure generated by cooking cannot open the auxiliary lid. The locking means 200, which locks the food container 130 to the auxiliary lid 150 by performing a rectilinear reciprocating motion, is driven by a torque from the motor 180.

When the food container and the auxiliary lid are completely locked or released by the locking means 200, the driving means should not be driven. For this purpose, the electric pressure cooker according to the present invention includes a sensing means 300 for detecting whether the food container and the auxiliary lid are locked or released.

In addition, the electric pressure cooker according to the present invention includes a manual rotating means 400 through which the user manually operates the locking means if the driving means is not functioning. Also, the manual rotating means 400 has a pressure display function which allows the user to check the inner pressure of the food container during a cooking operation from the outside of the cooker.

Furthermore, the electric pressure cooker according to the present invention includes a plurality of safety means (see FIGS. 15–21) which discharge vapor when the inner pressure of the cooker exceeds a predetermined pressure during cooking.

Referring to FIGS. 3, 4A, 4B, 5A and 5B, a locking means 200 according to the present invention will be described below.

Figure 4A:
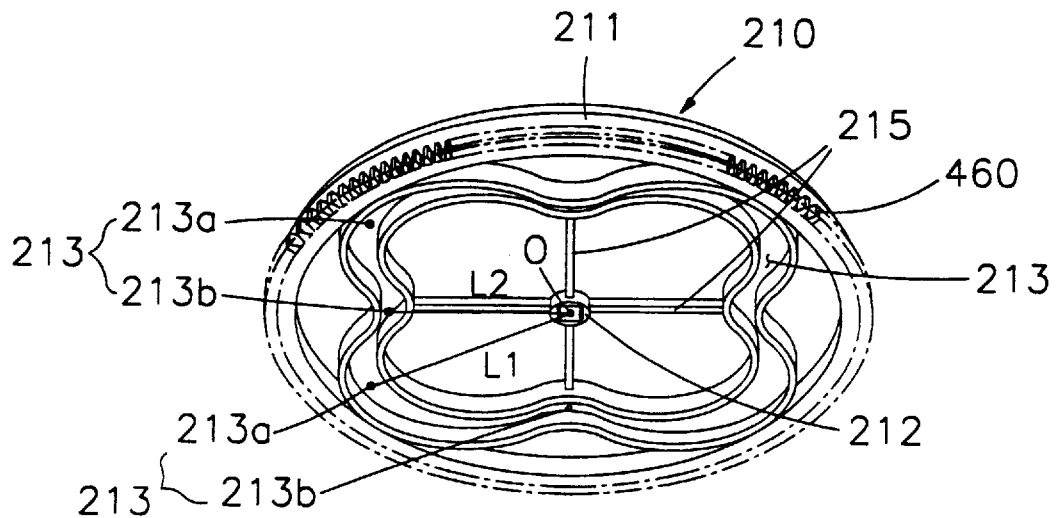
FIG. 4A is a perspective view illustrating the bottom of a rotating member in accordance with the present invention.
Figure 4B:
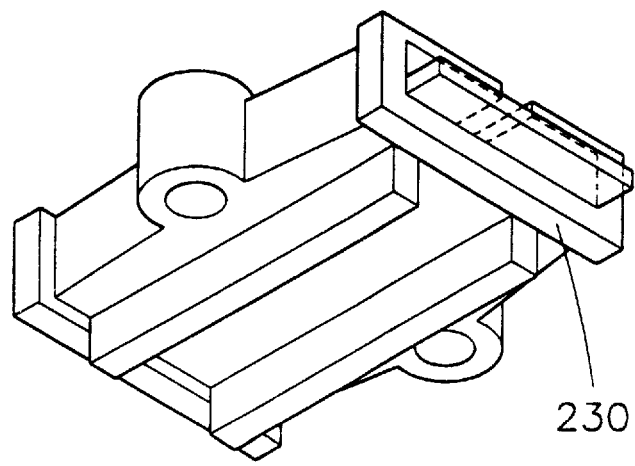
FIG. 4B is a perspective view illustrating a supporting means in accordance with the present invention.
Figure 5A:
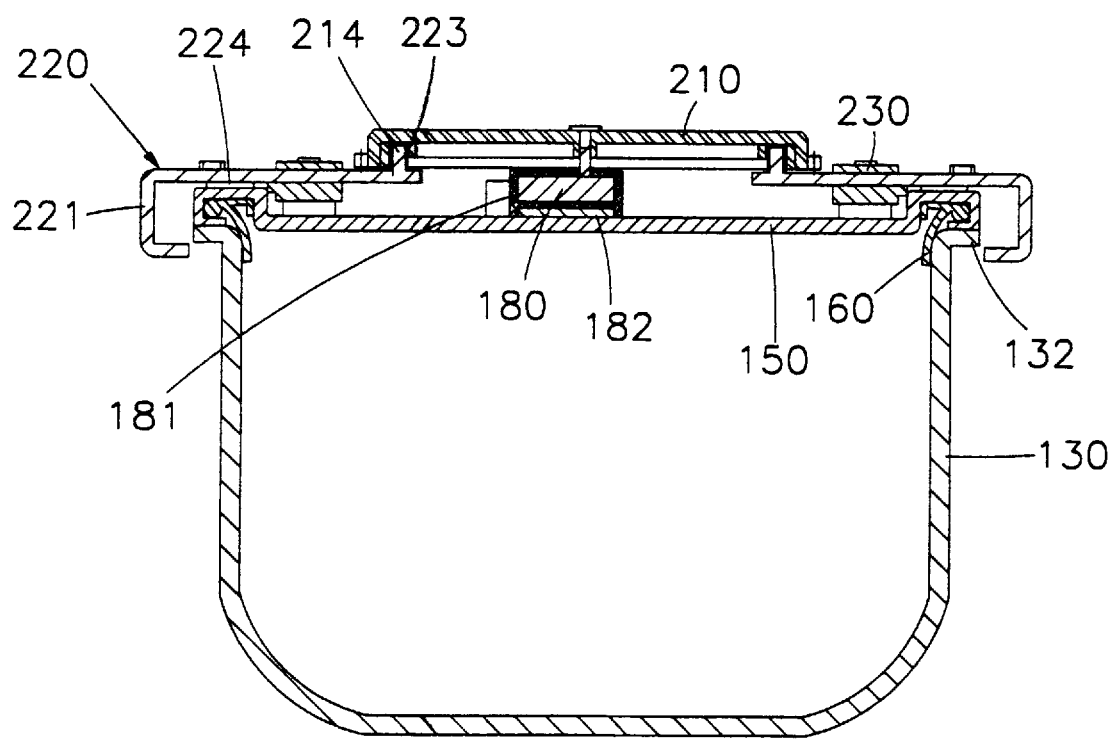
FIGS. 5A and 5B are cross-sectional views illustrating the operation of a locking means in accordance with the present invention.
Figure 5B:
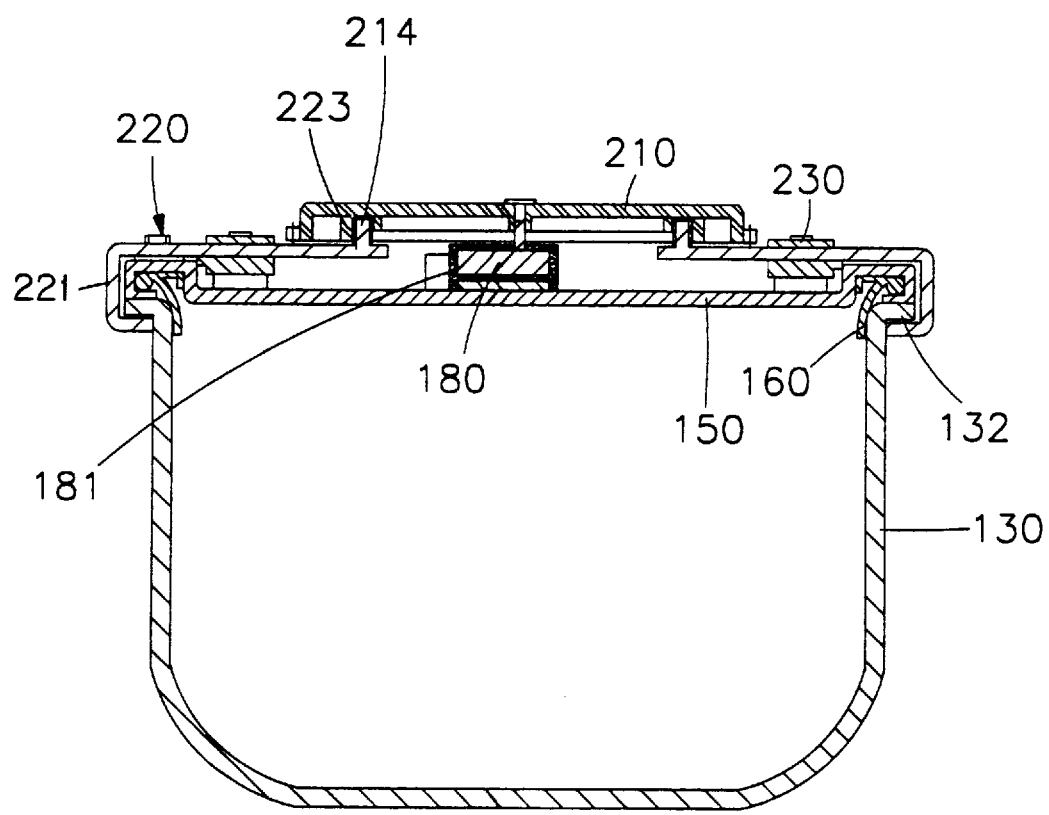

FIG. 3 is a perspective view illustrating a locking means in accordance with the present invention;

FIG. 4A is a perspective view illustrating the bottom of a rotating member in accordance with the present invention;

FIG. 4B is a perspective view illustrating a supporting member in accordance with the present invention; and FIGS. 5A and 5B are cross-sectional views taken on the line V—V in FIG. 3, and illustrate the operation of a locking means in accordance with the present invention.

A motor case 181, mounted to the top center of the auxiliary lid 150 contains the motor 180. A heat-insulating member 182, which prevents excessive heat from being transmitted to the motor 180, is provided below the motor case 181. The motor 180 is sealed in the motor case 181 by a covering member 183, which prevents the vapor generated during cooking from contacting to the motor 180. The heat-insulating member 182 and the covering member 183 also prevent the motor 180 from being damaged.

The locking means 200 according to the present invention includes a movement-shifting means for converting the rotating motion of the motor 180 to a rectilinear motion and an engaging member 220 for performing a rectilinear reciprocating motion by using the movement-shifting means.

The movement-shifting means includes a circular rotating member 210 and a connecting bar 214 that performs a rectilinear reciprocating motion. The rotating member 210 is connected to and rotated by the shaft 180a of the motor 180. One end of the connecting bar 214 is connected to the rotating member 210, and the other end is connected to the engaging member 220. It is through this end that the rectilinear reciprocating motion is transmitted to the engaging member 220. An inserting hole 212 into which the motor shaft 180a is inserted is formed in the center of the rotating member 210. An extending portion 211 is formed on the lower outer surface of the rotating member 210. The outer surface of the motor shaft 180a and the inner surface of the inserting hole 212 are polygonally formed in order to achieve accurate power transmission. A guide route 213 is provided on the bottom of the rotating member 210 and are circumscribed by the extending portion 211. The guide route 213 has a first region 213a which is separated from the rotation center 0 (i.e., a center of the inserting hole connected to the motor shaft) of the rotating member 210 by a constant distance L1, and also has a second region 213b which is separated from the rotation center 0 by a constant distance L2. The second region 213b is closer to the rotation center 0 of the rotating member 210 than the first region 213a. The guide routes adjacent to each other holds either the first region 213a or the second region 213b. The reason why the guide routes having the first region 213a and the second region 213b are formed to be connected therebetween is to make the connecting bar 214 perform a rectilinear reciprocating motion even if the motor is rotated in only one direction. The number of the guide routes is identical to that of the engaging members 220. A reinforcing rib 215 for reinforcement is provided to the rotating member 210.Therefore, numeral 460 is teeth.

As described above, since one end of the engaging member 220 is positioned in the recess 142 of the lower lid, the engaging member 220 cannot rotate. In addition, since the connecting bar 214 is connected to the other end of the engaging member 220, the connecting bar 214 cannot rotate. Accordingly, when the rotating member 210 having the guide route 213 is rotated by the rotation of the rotating member 210, the connecting bar 214 slides between the first region 213a and the second region 213b. As a result, the connecting bar 214 and the engaging member 220 perform a rectilinear reciprocating motion. A bushing 223 encompasses the connecting bar 214 in order to reduce frictional resistance generated between the guide route 213 and the connecting bar 214, thereby facilitating the rotation of the rotating member 210 and the smooth movement of the connecting bar 214.

One end of the engaging member 220 is bent in the shape of a hook 221 ⊂-shape. Contact portions between the auxiliary lid 150 and the rim 132 of the food container 130 are inserted into the hook 221. When the engaging member 220 performs a rectilinear reciprocating motion, the hook 221 slides over or disengages from the seam between the rim 132 and the auxiliary lid 150 so that the auxiliary lid 150 and the food container 130 are respectively locked or released. It is desirable that the number of engaging members 220 is four and that the angle between one and adjacent one is 90°. Also, it is also desirable that four pairs of the guide routes 213 are connected to one another. A slotted guide 230 for guiding the engaging member 220 so as to perform an accurate rectilinear reciprocating motion is attached to the auxiliary lid 150. An engaging passage 231 is formed in the guide 230, through which the guide is inserted. When the connecting bar 214 penetrates the engaging passage 231 and moves, the engaging member 220 is inserted into the guide 230 and connected thereto.

In addition, rails 224 on which the engaging member 220 is provided to the auxiliary lid 150. The rail 224 reduces a frictional resistance between the engaging member 220 rests are provided on the auxiliary lid 150.

FIG. 5A shows the food container and the auxiliary lid when they are not locked by the engaging member; and FIG. 5B show the food container and the auxiliary lid when they are locked by the engaging member.

Referring to FIGS. 5A and 5B, when cooker is turned on and a manipulation switch is pushed, the motor 180 is rotated so as to rotate the rotating member. This causes the connecting bar 214 inserted into the guide route 213 (see FIG. 4A) and the engaging member 220 connected to the connecting bar 214 to perform a rectilinear reciprocating motion. When the connecting bar lies in the first region 213a of the guide route 213, the hook 221 of the engaging member 220 is positioned outside of the rim 132 of the food container 130 so that the food container 130 and the auxiliary lid 150 are not locked by the hook 221, as shown in FIG. 5A.

However, when the motor 180 further rotates and the connecting bar 214 lies in the second region 213b of the guide route 213, the hook 221 slides over, thereby locking the food container 130 and the auxiliary lid 150.

As described above, when the rotating member 210 is rotated by the rotation of the motor 180, the engaging member 220 performs a rectilinear reciprocating motion. The food container 130 and the auxiliary lid 150 are locked or released by the hook 221 of the engaging member 220.

Figure 6:
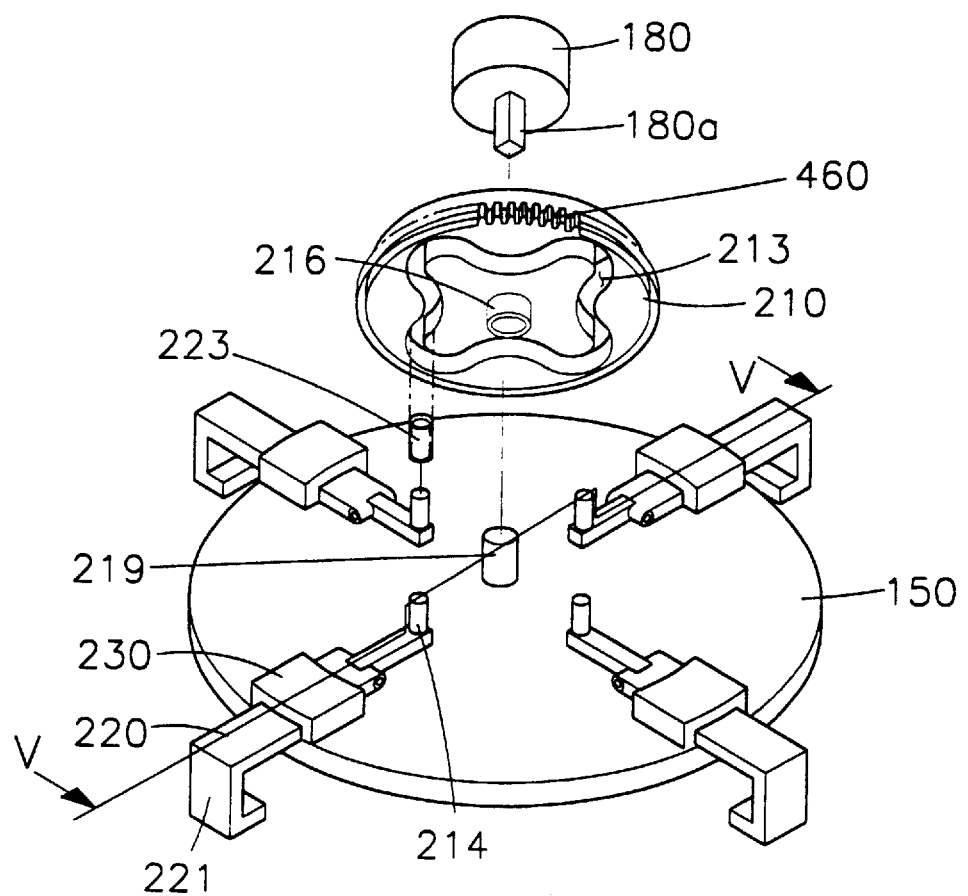
FIG. 6 is a perspective view illustrating a second preferred embodiment of a locking means in accordance with the present invention.
Figure 7A:
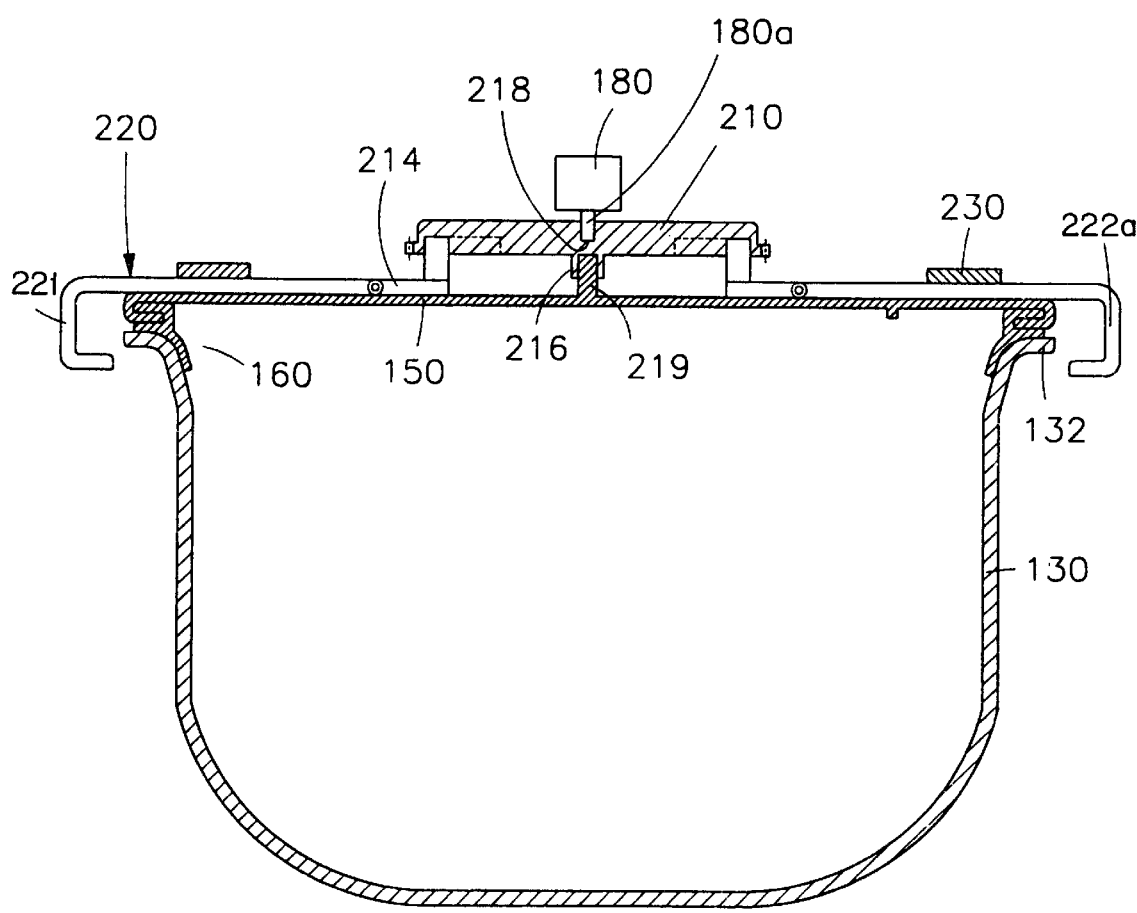
FIGS. 7A and 7B are cross-sectional views illustrating the operation of the locking means of FIG. 6.
Figure 7B:
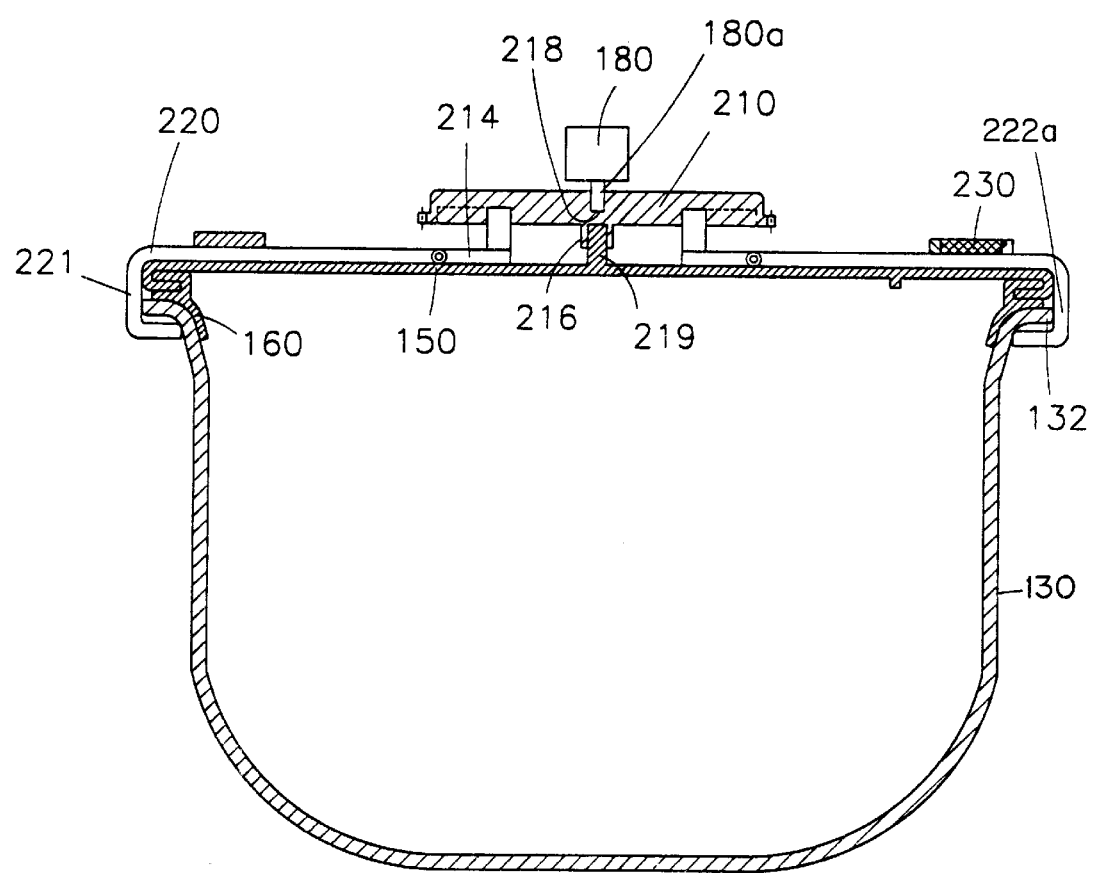

FIGS. 6 to 7B show a second embodiment of a locking means in accordance with the present invention.

FIG. 6 is a perspective view of the locking means.

FIGS. 7A and 7B are cross-sectional views taken on the line V—V in FIG. 6, and illustrate the operation of the locking means.

FIG. 7A is a cross-sectional view illustrating the food container 130 and the auxiliary lid 150 not being locked.

FIG. 7B is a cross-sectional view illustrating the food container 130 and the auxiliary lid 150 being locked.

The rotating member 210 is provided on the auxiliary lid 150, and the motor 180 is provided on the rotating member 210. The link-shaped connecting bar 21 (the movement-shifting means) and is connected to the engaging member 220. In brief, a supporting bar 219 is formed on the center of the auxiliary lid 150, and an inserting hole 216 into which the supporting bar 219 is inserted is provided on the bottom center of the rotating member 210. Accordingly, the rotating member 210 rotates upon the supporting bar 219. The guide route 213 is formed on the surface in which the inserting hole 216 is formed and centered upon the inserting hole 216. A motor shaft connection groove 218 into which the motor shaft is inserted is formed on the top center of the rotating member 210. The inner surface of the motor-shaft connection groove 218 is angularly formed to confirm to the shape the outer surface of the motor shaft 180a so that power is accurately transmitted. Additional structure and operations are the same as the aforementioned.

The electric pressure cooker according to the present invention further includes a means 300 for sensing a position of the locking means 200. The reason why position sensing means 300 is included in the electric pressure cooker is to determine if the food container 130 and the auxiliary lid 150 are locked by the hook 221. This information gathered by the position sensing means 300 is then used to detrmined whether stop or drive the motor 180. This structure and operation will be described with reference to FIGS. 8, 9A and 9B.

Figure 8:
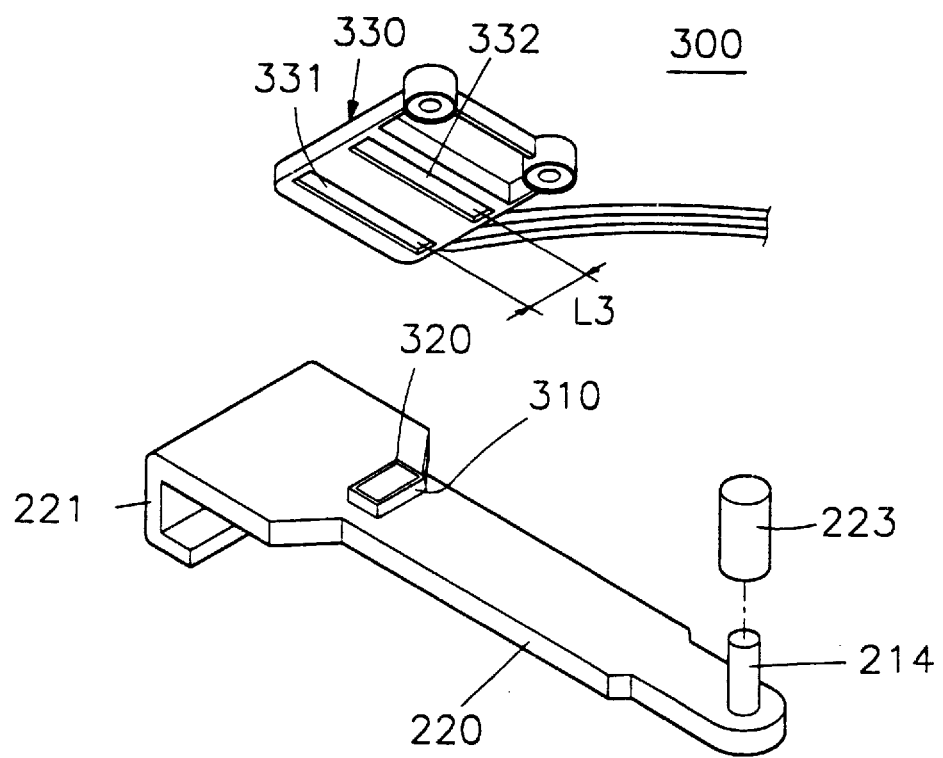
FIG. 8 is a perspective view illustrating a position sensing means in accordance with the present invention.
Figure 9A:
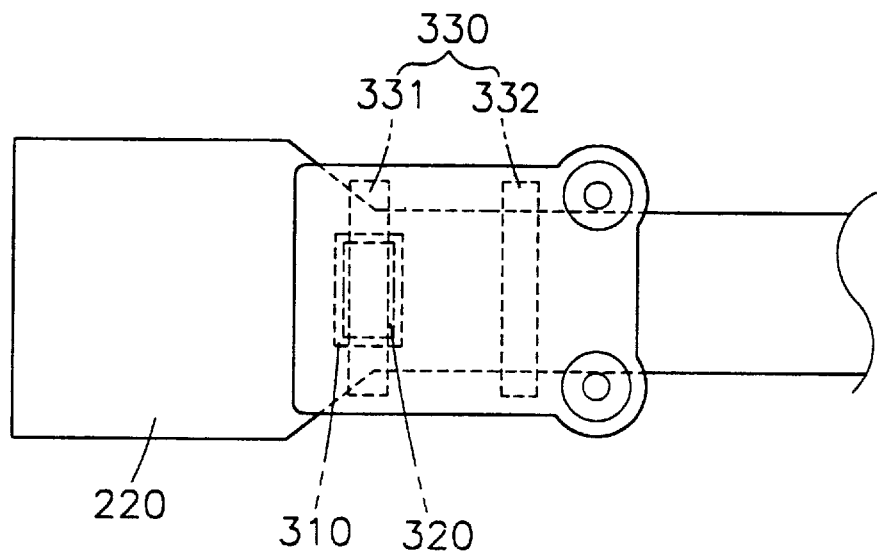
FIGS. 9A and 9B are plan views illustrating the operation of a position sensing means in accordance with the present invention.
Figure 9B:
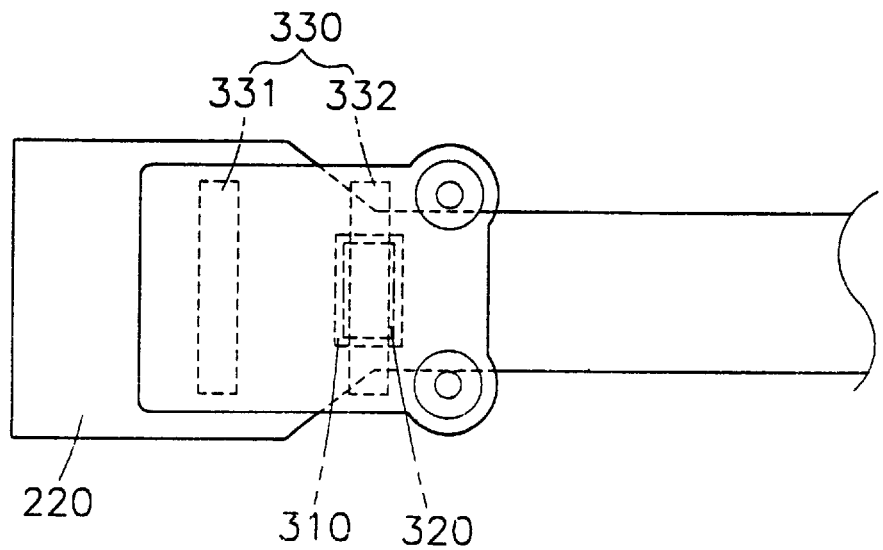

FIG. 8 is a perspective view illustrating the inventive position sensing means; and FIGS. 9A and 9B are plan views illustrating the operation of the position sensing means.

The position sensing means 300 is provided on the engaging member 220. There is a magnet inserting portion 310 on the top of the engaging member 220 into which a magnet 320 is inserted. Accordingly, the magnet 320 performs the same rectilinear reciprocating motion as the engaging member 220.

A sensing means 330 for sensing whether the magnet 320 is positioned under the sensing means 330 is provided above the magnet 320. The sensing means 330, embodied is a reed switch, has two switches 331 and 332 connected to a controller 120. The gap L3 between the first switch 331 and the second switch 332 is identical to the stroke length of the reciprocating engaging member 220. Accordingly, the magnet 320 is positioned under the first reed switch 331 when the hook 221 of the engaging member 220 has not locked the food container 130 and the auxiliary lid 150, and the magnet 320 is positioned under a second reed switch 332 when the hook 221 of the engaging member 220 has locked the food container 130 and the auxiliary lid 150. When the engaging member 220 has moved to it inner-or outermost position, the magnet 320 is positioned under either the first switch 331 or the second switch 332. When engaging member 220 positions the magnet 320 under either reed switch, the controller recognizes it as meaning that the engaging member 220 is positioned in either a top dead position or a bottom dead position, and then discontinues the operation of motor 180.

Referring to FIG. 2, the auxiliary lid 150 is formed to be able to rise within the lid 140. It is slightly elevated above the food container 130 by the plate springs 151. The hook 221 can easily lock the food container 130 and the auxiliary lid 150 because the height of the space within the hook 221 is greater than the thickness of the contact portion between the food container 130 and the auxiliary lid 150. The difference between their respective height and thickness is the distance that the plate springs 151 raise the auxiliary lid 150.

The electric pressure cooker additionally includes a manual rotating means 400 which allows the rotating member 210 to be manually rotated on the condition of a malfunction of the motor 180. It also includes a pressure display means which allows the user to monitor from the outside the pressure level in the food container 130 during cooking. The pressure display means will be described with reference to FIGS. 10a –10c and 11.

Figure 10:
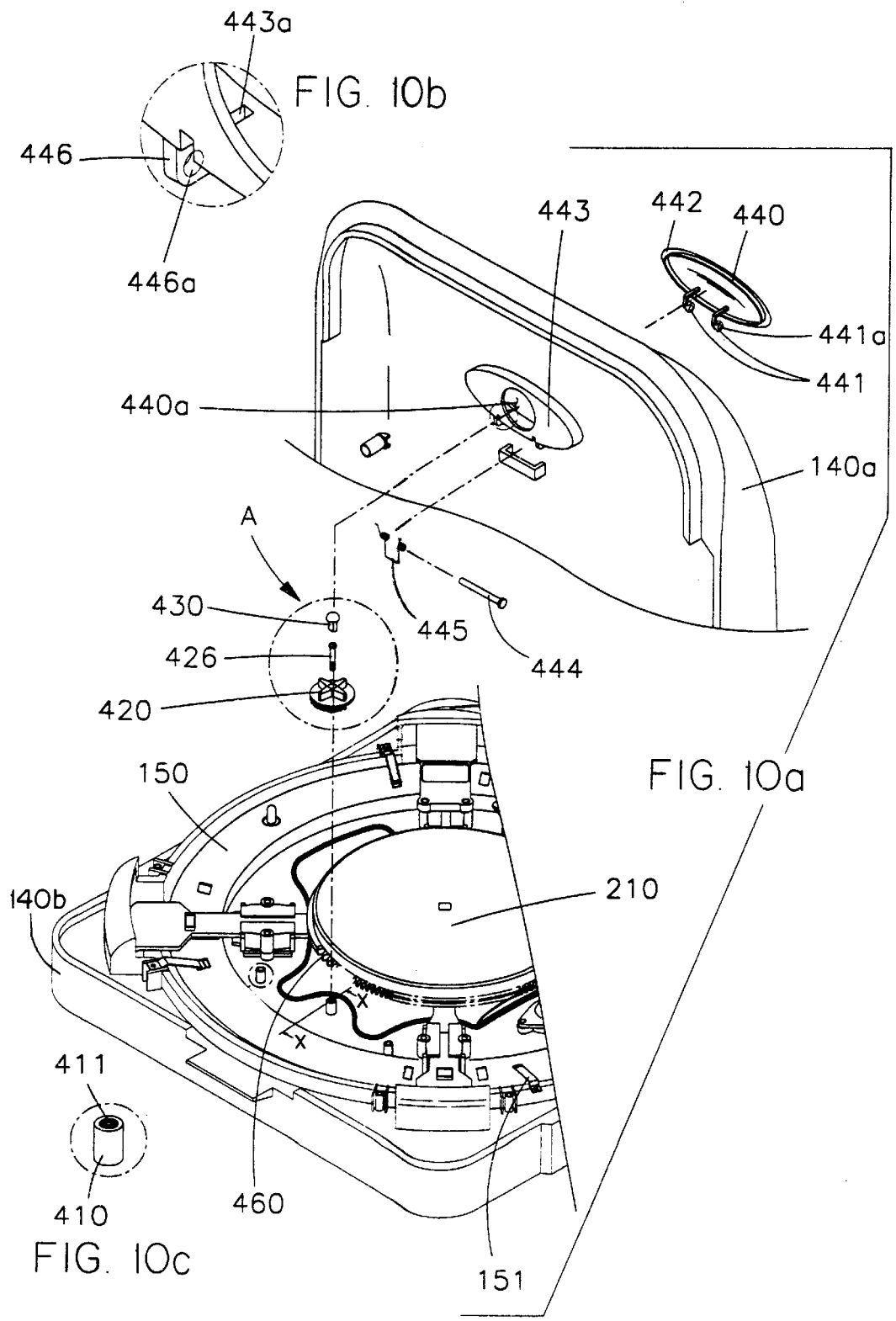
FIGS. 10a–10c depict a perspective view illustrating a manual rotating means and a pressure display means in accordance with the present invention.
Figure 11:
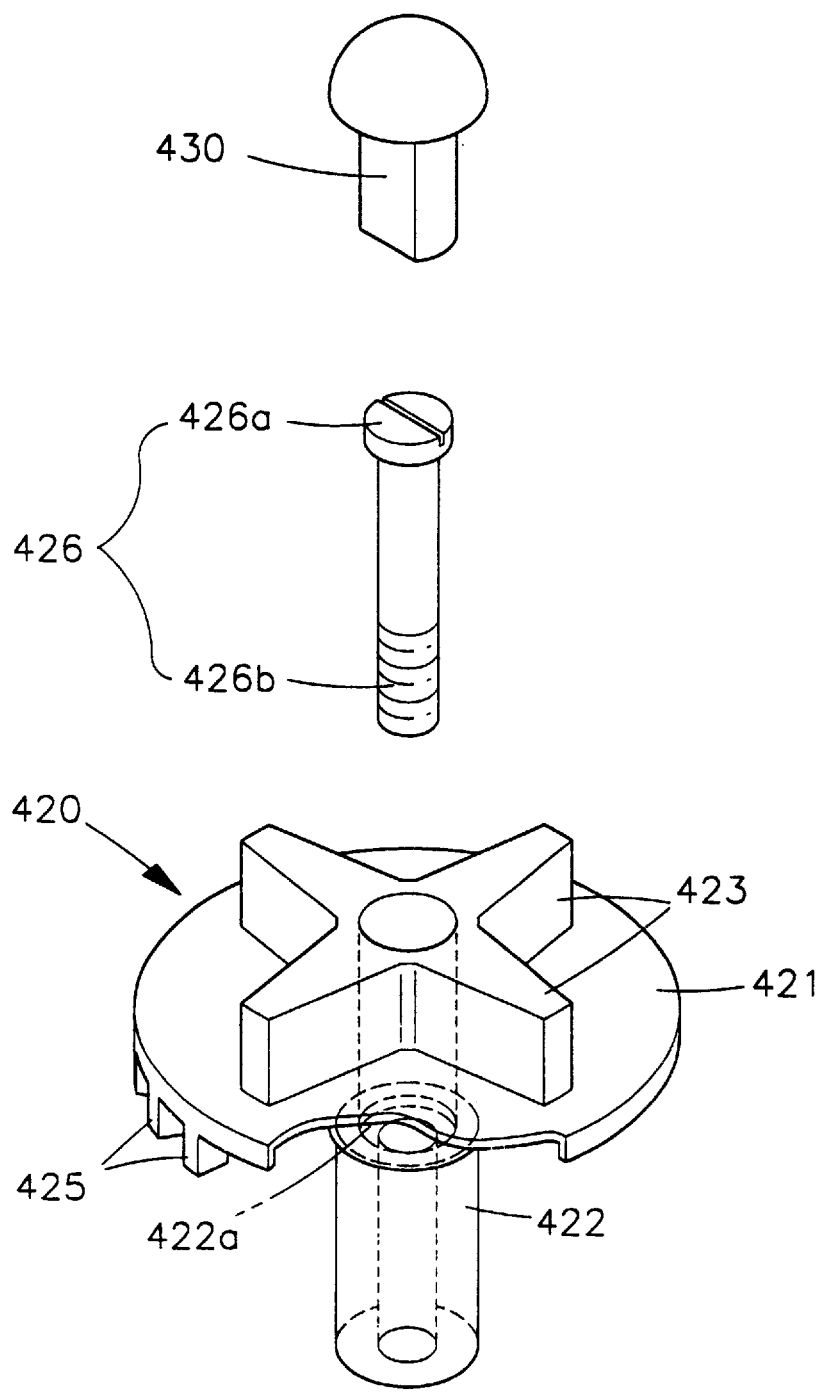
FIG. 11 is a detailed diagram illustrating the portion "A" of FIGS. 10a –10c.

FIGS. 10a –10c is a perspective view illustrating a manual rotating means and a pressure display means in accordance with the present invention; and FIG. 11 is a detailed diagram illustrating the portion "All" shown in FIGS. 10a –10c.

Teeth 460 are formed on the a circumference of the rotating member 210. A projecting bar 410 adjacent to the rotating member 210 is provided on one end of the auxiliary lid 150. A screw hole 411 is formed in the projecting bar 410. A rotating lever 420 for manually rotating the rotating member 210 is connected to the projecting bar 410. The rotating lever 420 has a circular body 421, a cylinderical engaging portion 422 extended above and below the center of the body 421, and a knob 423 formed on the body 421.

A fastening member 426 for connecting the rotating lever 420 to the projecting bar 410 is inserted into the engaging portion 422 so that the rotating lever 420 rotatably moves within the engaging portion 422. A screw thread 426b provided on one end of the fastening member 426 is connected to the screw hole 411 of the projecting bar 410. That is, the uniform surface of the fastening member 426 is inserted into the engaging portion 422 and the screw thread 426b of the fastening member 426 is connected to the projecting bar 410 so that the rotating lever 420 rotates. In order to hold the rotating lever 420 to the engaging member 220, a step-like recess 422a in which the head 426a of the fastening member 426 rests is formed in the inner circumference of the engaging member 422. Teeth 425 are formed on half of the circumference of the rotating lever body 421. The teeth 425 of the rotating lever 420 engaged with the teeth 460 of the rotating member 210 so that the rotating member 210 rotates when the rotating lever 420 is rotated. The teeth 425 of the rotating lever 420 are formed only half of the circumference of the rotating lever 420 by half, in order to prevent a rotation of the rotating lever 420 when the rotating member 210 is rotated by the motor 180. That is, if the side of the rotating lever 420 not having teeth is adjacent to the rotating member 210, the rotating lever 420 is not rotated even if the rotating member 210 is rotated.

One end of a contacting bar 430 is connected to the engaging portion 422 of the rotating lever 420. The other end of the contacting bar 430 contacts a display window 440 that opens/closes the opening 440a formed on the upper lid 140a. The display window 440 is rotatably connected along one edge. Accordingly, when the contacting bar 430 is elevated by the rising of the auxiliary lid 150, the unattached end of the display window 440 is projected upward. Their signifies to the user that pressure has formed in the food container 130.

More specifically, pair of engaging projections 441 extended downward are formed on the back end of the display window 440 and a removal preventing rim 442 extending outward is formed on the top of the display window 440. The removing-preventing rim 442 supports the display window 440 on the edge of opening 440a in the upper lid 440 so that the display window 440 does not drop into the opening 440a. The contacting bar 430 penetrates the bottom of the upper lid adjacent to the opening 440a and the engaging portion 443 is connected to the engaging projection 441 of the display window 440. A penetrating hole 443a through which the engaging projection 441 is inserted is formed on the back vertical surface of the engaging portion 443. The engaging plate 446 is formed on one end of the penetrating hole 443a, and a first engaging hole 446a is formed on the engaging plate 446. A second penetrating hole 441a is formed in the vicinity of the engaging projection 441 that penetrates the penetrating hole 443a. A engaging pin 444 is inserted into the first and second penetrating holes 446a and 441a. An elastic member 445 for returning the display window 440 to the closed position is inserted into the engaging pin 444.

Figure 12A:
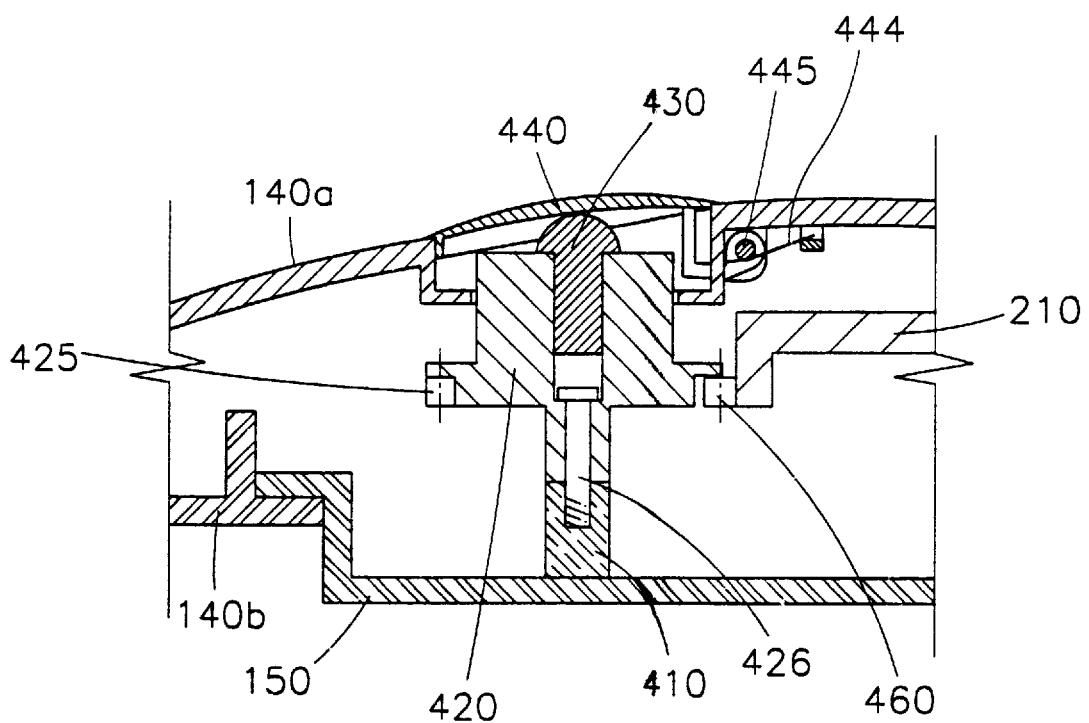
FIGS. 12A to 12C are cross-sectional views illustrating the operation of a manual rotating means and a pressure display means in accordance with the present invention.
Figure 12B:
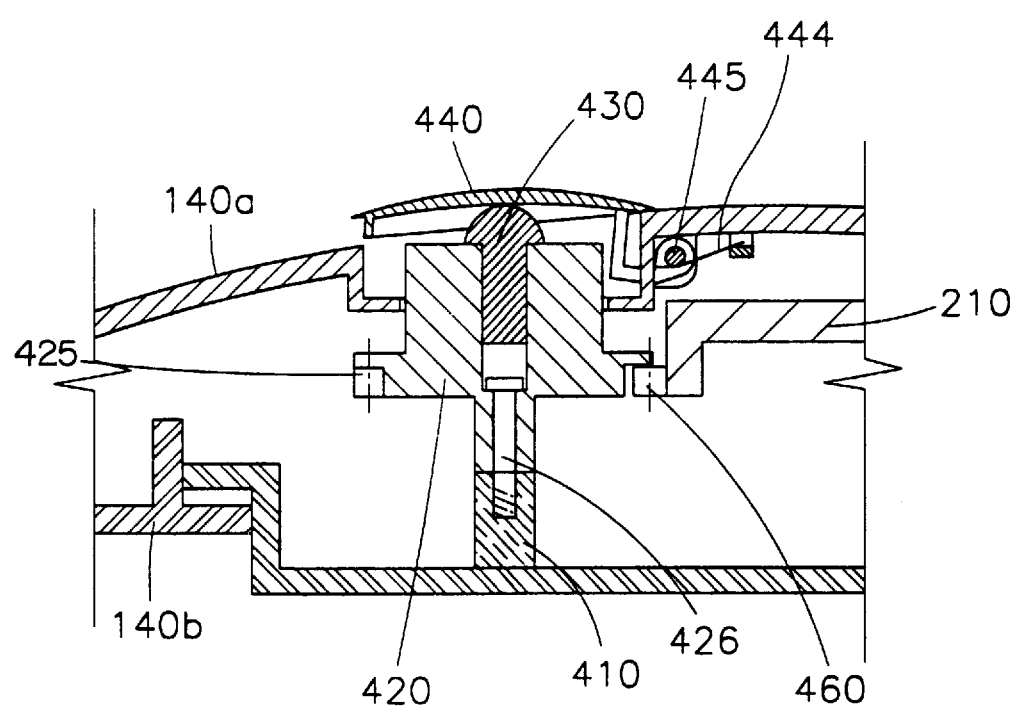
Figure 12C:
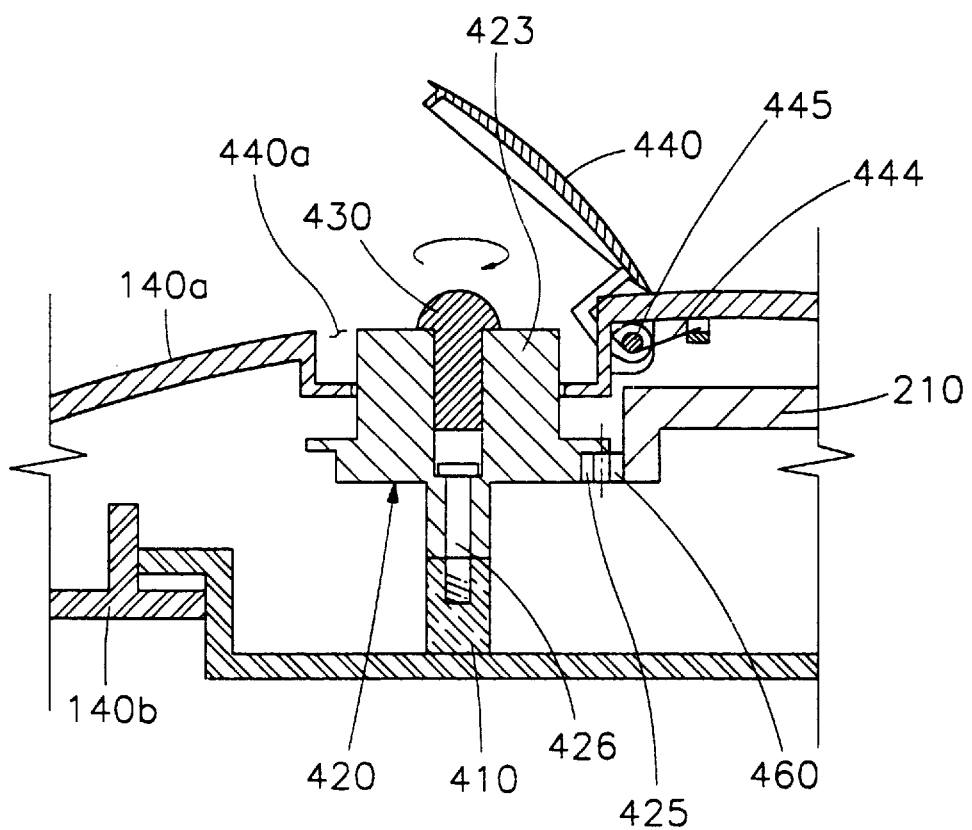

FIGS. 12A to 12C are cross-sectional views taken on the line X—X in FIG. 10 and illustrate the arrangement of the manual rotating means and the pressure display means in accordance with the present invention;

FIG. 12A shows the above arrangement when there is no pressure in the container;

FIG. 12B shows the above arrangement when there is presure in the food container that raises the auxiliary lid; and FIG. 12C shows when the user rotate the rotating member to rotate the rotating lever because of a malfunction of the motor.

The rotating lever 420 is fastened to the projecting bar 410 provided on the auxiliary lid 150 by a fastening member 426. The contacting bar 430 is connected to the top of the rotating lever 420. Normally, the part of the rotating lever's 421 circumference that does not have the teeth 425 is facing the teeth 460 of the rotating member 210. In the resting state, the contacting bar 430 contacts the underside of the display window 440, as shown in FIG. 12A. When the cooker begins to cook, vapor pressure is produced inside the food container 130. As a result, the auxiliary lid 150, which sealed to the top of the food container 130, is elevated. When the pressure in the food container 130 exceeds a predetermined pressure, the vapor in the food container 130 is discharged through the vapor discharging device. However, when the rate of vapor production exceeds the rate of vapor discharge, the auxiliary lid 150 is elevated upward. Accordingly, the following are elevated sequentially: the projecting bar 410, the rotating lever 420, the contacting bar 430 and the display window 440. The elevation of the display window 440 signifies to the user that pressure exists in the food container 130, as shown in FIG. 12B.

Thereafter, if the motor 180 malfunctions when the food container 130 and the auxiliary lid 150 are locked by the hook 221, the user can open the display window 440, and rotate the knob 423. As a result, the teeth 425 of the rotating lever 420 engage the teeth 460 of the rotating member 210, thereby rotating the rotating member 210. This slides the hook 221 off of the contact portion between the food container 130 and the auxiliary lid 150 so the auxiliary lid 150 can be opened.

FIGS. 13a–13c depict is a perspective view illustrating a second preferred embodiment of a manual rotating means and a pressure display means in accordance with the present invention.

The teeth 460 are formed on the circumference of the rotating member 210 and a cylindrical projecting bar 410 adjacent to the teeth 460 is formed on the auxiliary lid 150. The rotating lever 420, which is connected to the teeth 460 and rotates the rotating member 210, is inserted into the projecting bar 410 and connected thereto.

The rotating lever 420 includes a circular body 427, an engaging portion 428 extended downward from the bottom of the body 427, and a knob 429 extended upward the top of the body 427. The inserting hole 428a into which the projecting bar 410 is inserted is formed in the engaging portion 428. The teeth 428b, which are engaged with the teeth 460 of the rotating member 210, are formed on the circumference of the engaging portion 428. A stopper 470 is detachably connected to the knob 429 and the top of the stopper 470 is inserted into the opening 440a.

Operations of the second embodiment of the rotating means and pressure display means according to the present invention will be described with reference to FIGS. 14A to 14C which are cross-sectional views taken on the line X—X in FIG. 13.

Figure 14A:
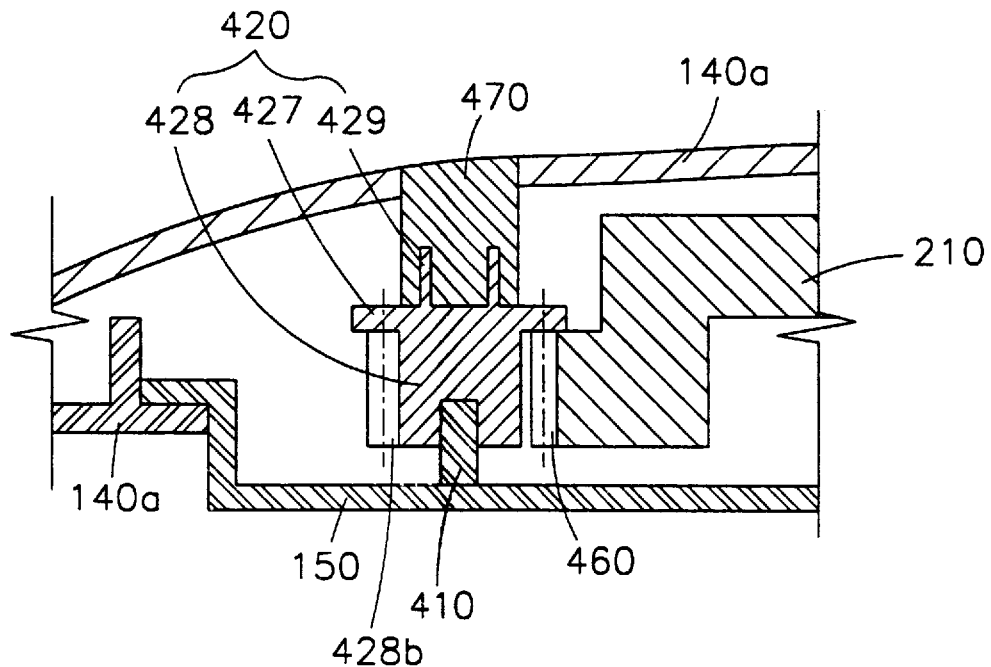
FIGS. 14A to 14C are cross-sectional views illustrating the operation of the manual rotating means and pressure display means of FIG. 13.
Figure 14B:
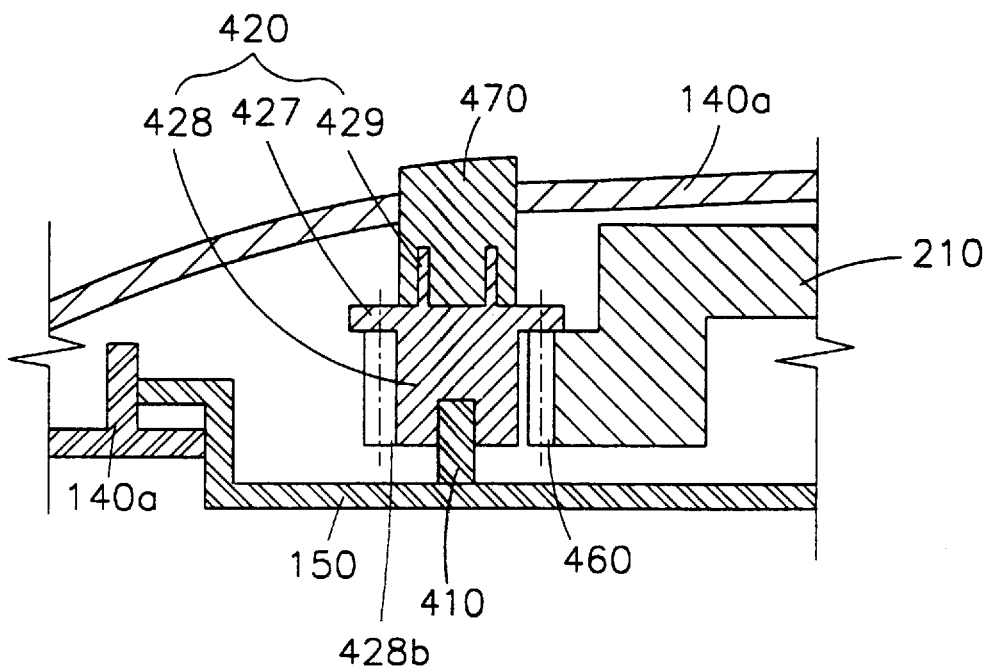
Figure 14C:
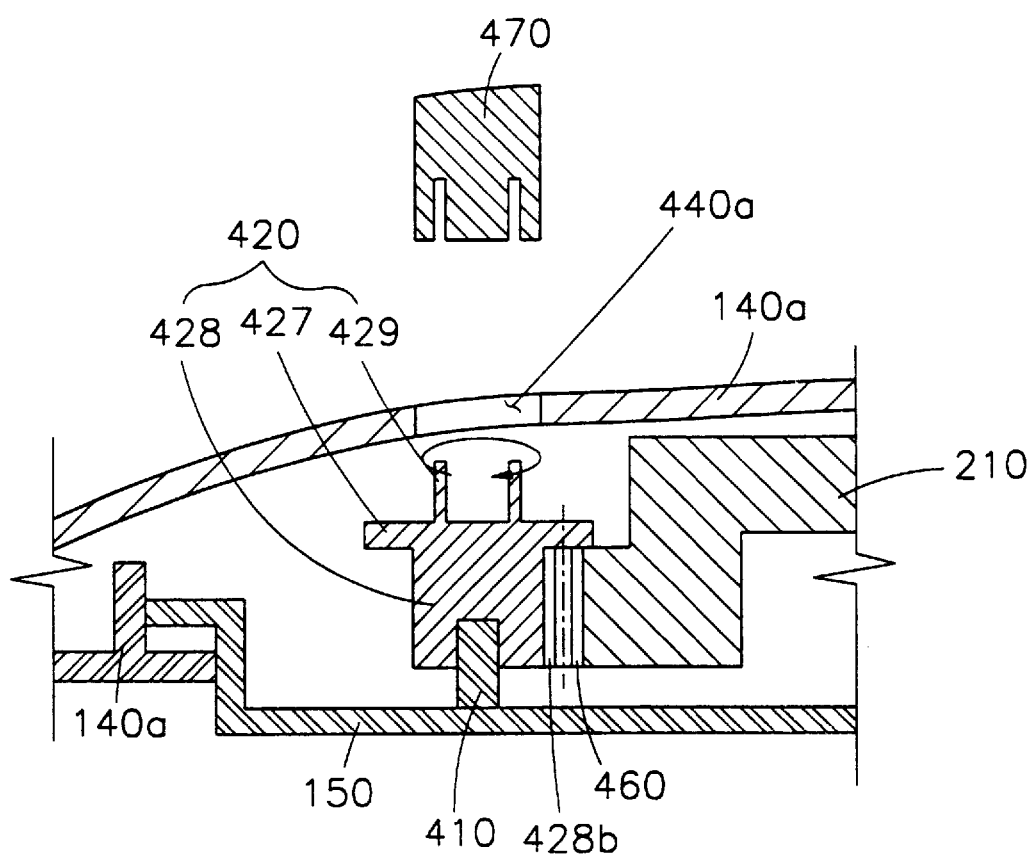

FIG. 14A is a cross-sectional view illustrating the rotating means and pressure display means when there is no pressure in the container;

FIG. 14B is a cross-sectional view illustrating when the auxiliary lid is elevated by the pressure generated in the container; and FIG. 14C is a cross-sectional view illustrating a state in which the rotating member rotates, when the rotating lever is rotated due to a malfunction of the motor.

During operation, after the stopper 470 is extracted from the rotating lever 420, the user then grips and rotates the knob 429 of the rotating lever 420. Other operations regarding FIGS. 14A to 14C are identical with those of FIG. 12.

As described above, when the auxiliary lid is elevated by the pressure produced during cooking, the display window 440 (or stopper 470) is raised, thereby signifying to the user that cooking is proceeding normally.

Hereinafter, a plurality of safety means mounted to the electric pressure cooker according to the present invention will be described.

The first safety means of the plurality of safety means mounted to the sealing member will be described with reference to FIGS. 15 to 17B.

Figure 15:
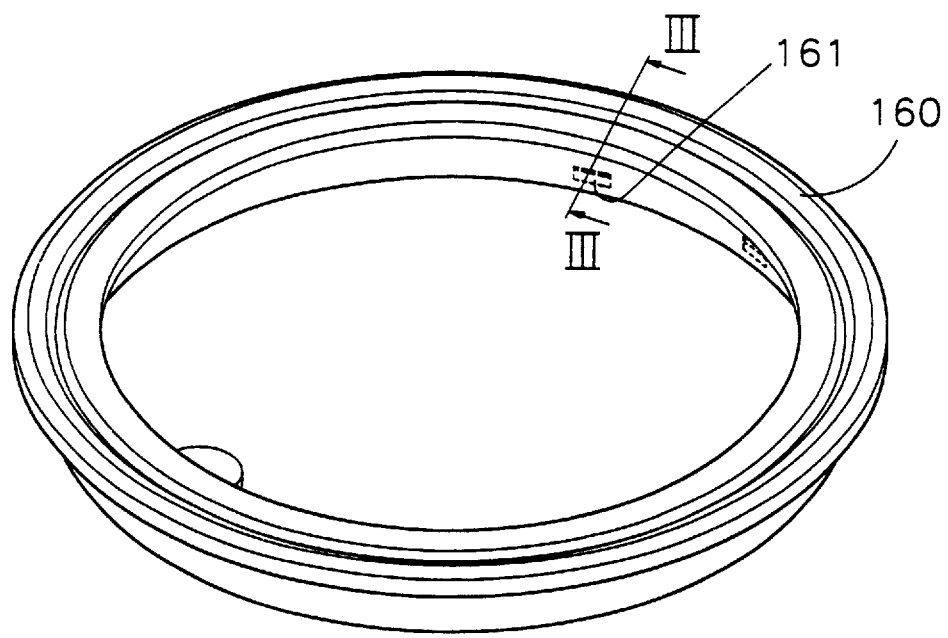
FIG. 15 is a perspective view illustrating a sealing member in accordance with the present invention.
Figure 16A:
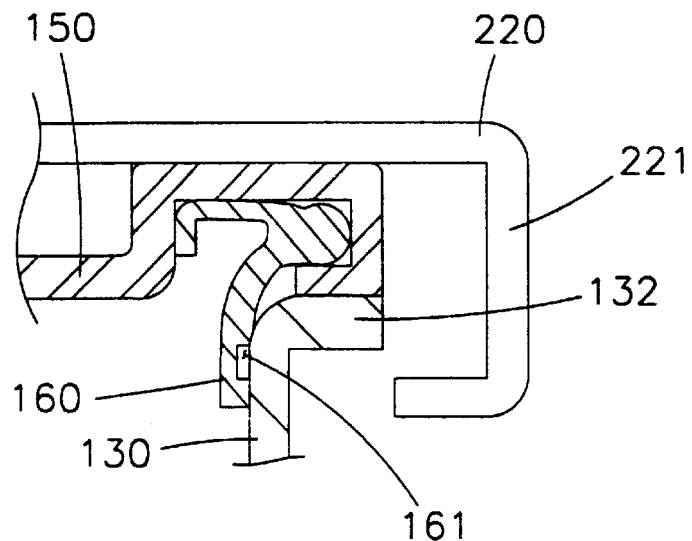
FIGS. 16A and 16B are cross-sectional views illustrating the coupling of a sealing member in accordance with the present invention.
Figure 16B:
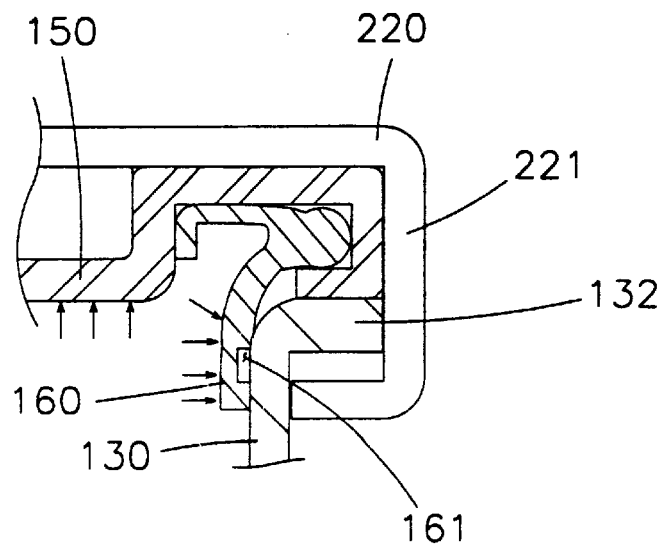
Figure 17A:
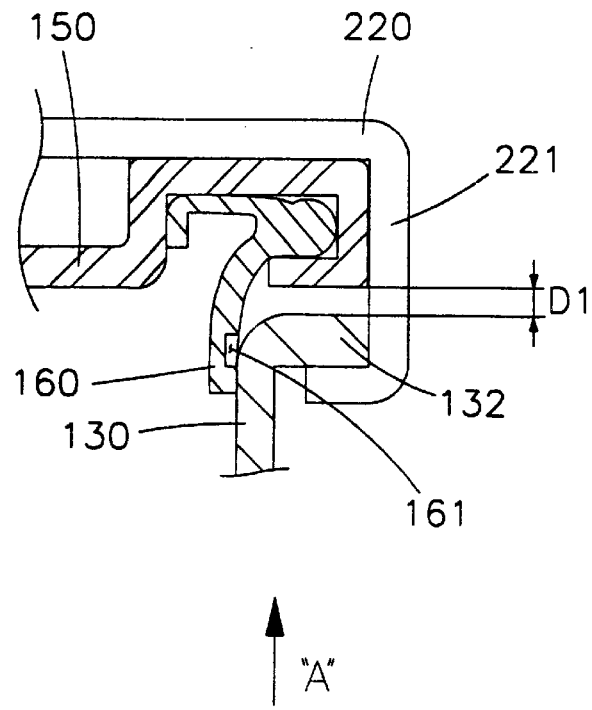
FIGS. 17A and 17B depict the operation of the safety means mounted to a sealing member in accordance with the present invention.
Figure 17B:
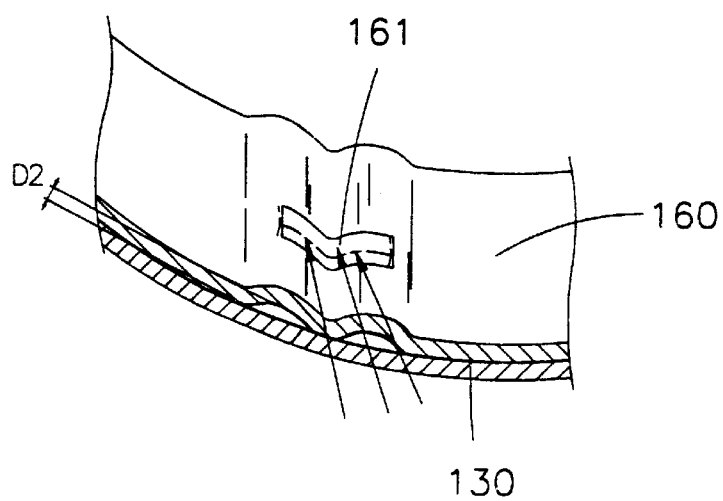

FIG. 15 is a perspective view illustrating the sealing member according to the present invention;

FIGS. 16A and 16B are cross-sectional views illustrating the sealing member when the auxiliary lid and food containerare coupled;

FIGS. 17A and 17B depict the operation of a safety means mounted to the sealing member in accordance with the present invention. FIG. 16A shows the situation in which the food containerand the auxiliary lid are not locked by the engaging member;

FIG. 16B shows the situation in which the food containerand the auxiliary lid are locked by the engaging member;

FIG. 17A shows that the auxiliary lid elevated by the vapor pressure and the resultant gap between the sealing member and the food containeris generated, through which excess vapor is discharged; and FIG. 17B shows a front view of FIG. 17A at the direction "A".

When the electric cooker as shown in FIG. 16A is operated by the user, the food container 130 and the auxiliary lid 150 are locked by the engaging member 220 as shown in FIG. 16B. As the cooking operation proceeds, vapor is produced. At this time, the vapor is not discharged outside the food container 130 through the sealing member 160, which seals the contact portion between the food containerand the auxiliary lid 150. As the inner pressure of the food container 130 increases, the auxiliary lid 150 is elevated toward the upper side of the food container 130 as shown in FIG. 17A. After the pressure inside the food container 130 exceeds a predetermined pressure, the vapor is discharged through the vapor discharging device 170 shown in FIG. 1.

The safety means of the electric pressure cooker uses the elevation of the auxiliary lid 150 and the pressure operated to the surface of the food container 130, thereby automatically discharging the vapor when the food container 130 has a constant pressure that is higher than the predetermined pressure.

The first safety means is a plurality of grooves 161 formed on the sealing member 160. The grooves 161 are formed on the outer surface of the sealing member 160 which contacts the inner surface of the food container 130. In a normal state, the portions of the sealing member 160 above and below the groove 161 contact the surface of the food container 130. However, when the auxiliary lid 150 is elevated, at least the upper part of the groove 161 is positioned in front of the gap D1 between the auxiliary lid 150 and the food container 130.

After a predetermined pressure has been reached in the container, the vapor is discharged through the vapor discharging device. However if not enough vapor is discharged through the vapor discharging device, the pressure inside the food container 130 exceeds the predetermined pressure and, consequently, the vapor pressure is applied to the sealing member, resulting in the situation shown in FIGS. 17A and 17B. Namely, the area of sealing member 160 above the groove 161 is separated from the food container 130. The surface of the sealing member 160 is not contacted with the inner surface of the food container 130 initially, but the surface of the sealing member 160 is ready to contact with the inner surface of the food container 130 if the vapor pressure is operated. Since the area on either side of the groove 161 are wrinkled, the sealing member 160 is separated from the food container 130 when the sealing member 160. Then, when the upper part of the groove 161 is positioned in the gap D1 between the rim 132 and the auxiliary lid 150, the vapor is discharged.

Figure 18A:
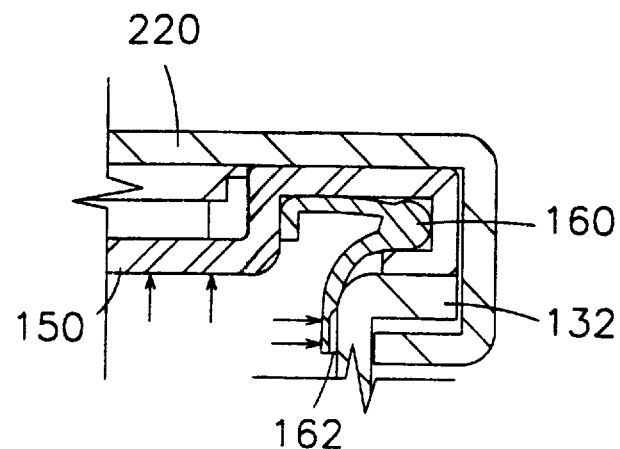
FIGS. 18A and 18B are cross-sectional views illustrating a second preferred embodiment of the safety means of FIGS. 17A to 17B.
Figure 18B:
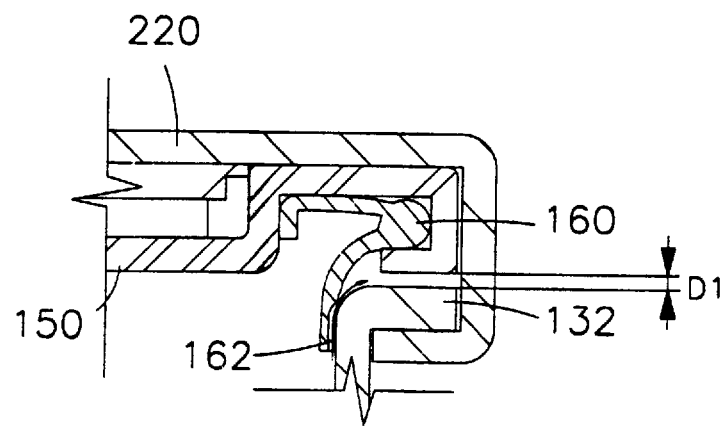

FIGS. 18A and 18B are cross-sectional views illustrating a second preferred embodiment of the first safety means in accordance with the present invention;

FIG. 18A shows the auxiliary lid when it is not raised by vapor pressure in the food container 130; and FIG. 18B shows the auxiliary lid when it is raised by vapor presure in the food container 130.

The second embodiment of the first safety means is a groove 162, which is open to the inside of the container, formed on the outer surface of the sealing member. The raising of the auxiliary lid by excess pressure in the food containerrepositions the groove 162 in such a way that it provides a channel through which vapor can escape from the container. More specifically, in a normal state, the upper end of the groove 162 is in contact with the inside surface of the food container 130. But when vapor pressure elevates the auxiliary lid 150, the upper end of the groove 162 is positioned at the gap D1 between the raised auxiliary lid 150 and the food container 130.

Figure 19A:
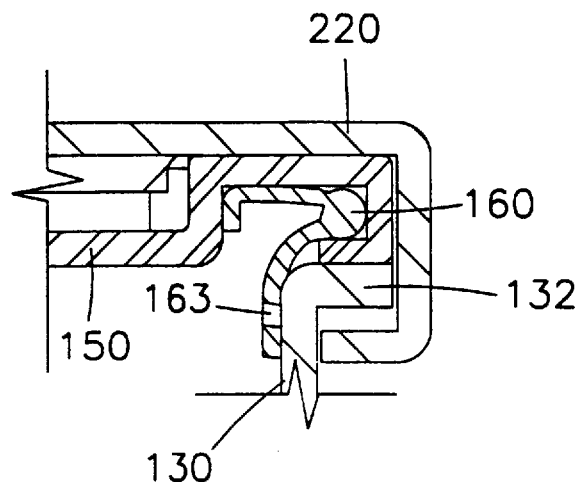
FIGS. 19A and 19B are cross-sectional views illustrating a third preferred embodiment of the safety means of FIGS. 17A to 17B.
Figure 19B:
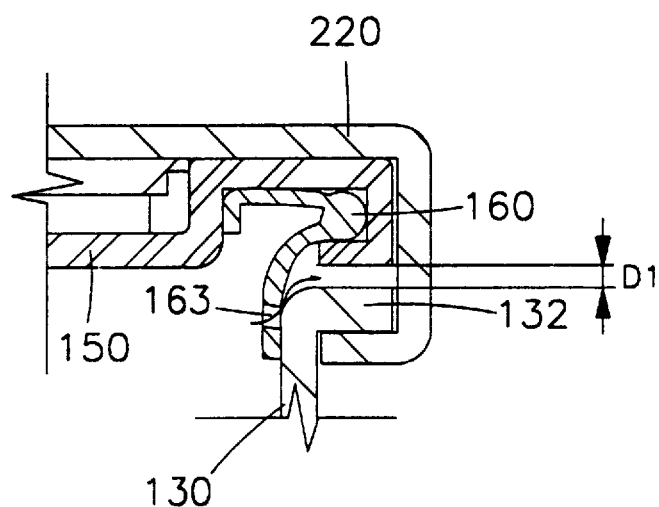

FIGS. 19A and 19B are cross-sectional views illustrating a third another preferred embodiment of the first safety means in accordance with the present invention. In this case, the safety means formed to one end of the sealing member 160 is a discharge hole 163. The discharge hole 163 is formed to a portion of the sealing member 160 contacted with the inner surface of the food container 130, when the auxiliary lid 150 is closed. More specifically, the discharge hole 163 is positioned at the lower side of the rim 132 of the food container 130 when the auxiliary lid 150 is not raised by the pressure in the food container 130, and the upper end of the discharge hole 163 is positioned in the gap D1 between the auxiliary lid 150 and the rim 132 of the food containerwhen the auxiliary lid is raised. Since the discharge hole 163 creates an outlet passage to the gap D1 between the auxiliary lid 150 and the food container 130, the excess vapor is discharged when the auxiliary lid 130 is raised.

Figure 20:
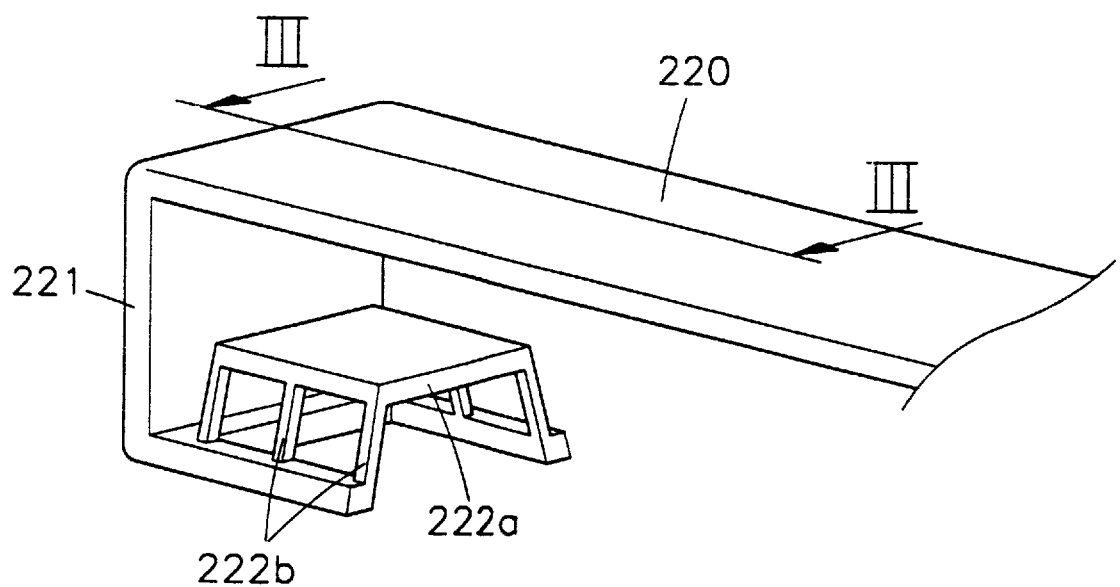
FIG. 20 is a perspective view illustrating the safety means mounted to an engaging means in accordance with the present invention.

Another safety means, as shown in FIG. 20, is mounted on the electric pressure cooker according to the present invention. This safety means enlarges the inner volume of the food container 130 when the inner pressure of the food container 130 increases and allows the discharge of excess pressure under extreme circumstances, thereby reducing the pressure in the food container 130.

FIG. 20 is a perspective view illustrating the above safety means, which is mounted to the aforementioned engaging means.

A hook 221 for locking the region of between the rim 132 and the auxiliary lid 150, and an engaging piece 222*a*, which is positioned on the inside surface of the hook 221 and contacts the rim 132, are provided. The engaging piece 222*a* is connected to the rim 221 by a plurality of connecting pieces 222*b*, which break if a force greater than a predetermined force is applied thereto.

Operation of the aforementioned second safety means will be described with reference to FIGS. 21A to 21C, which are cross-sectional views taken on the line III—III in FIG. 20.

Figure 21A:
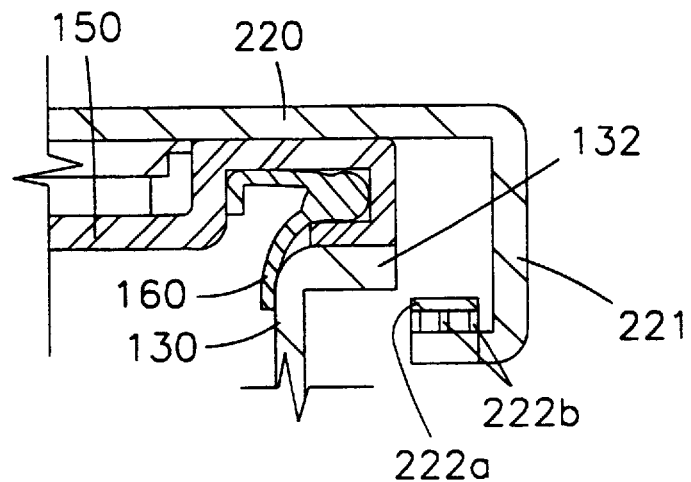
FIG. 21A to 21C are cross-sectional views illustrating the operation of the safety means of FIG. 20.
Figure 21B:
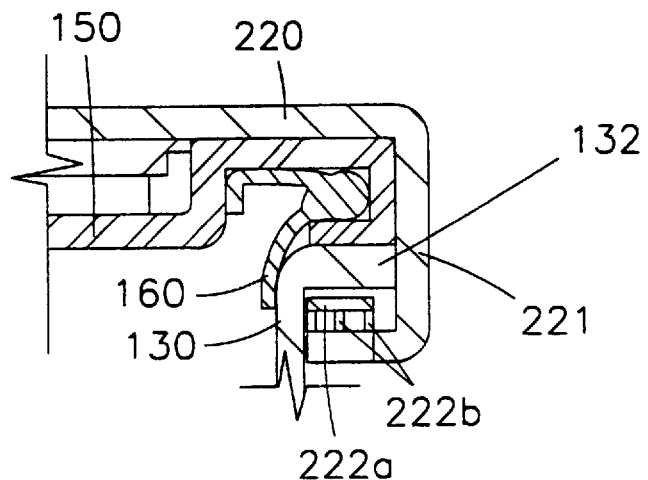
Figure 21C:
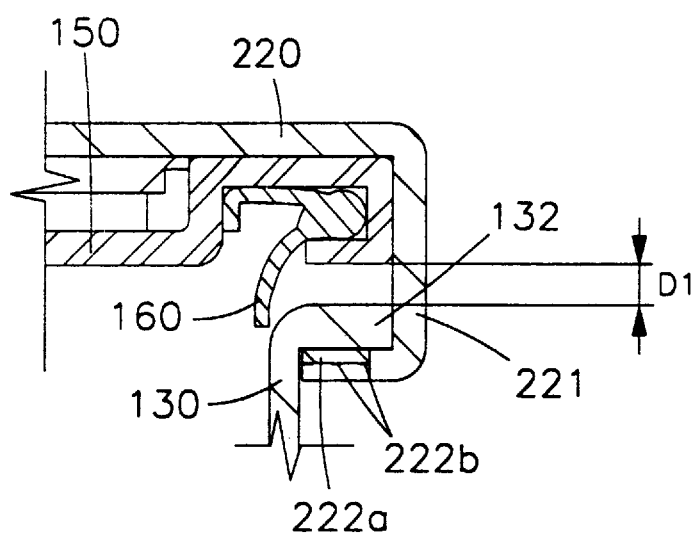
Figure 22:
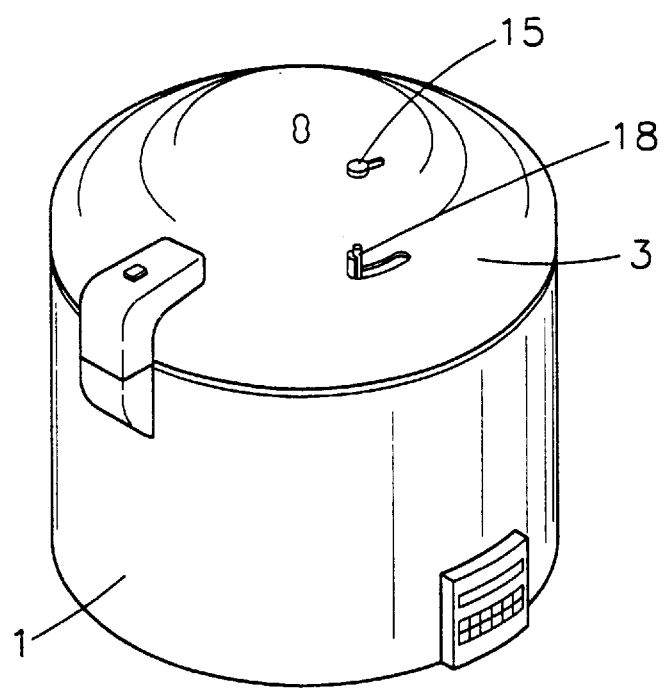
FIG. 22 is a perspective view illustrating a conventional electric pressure cooker.
Figure 23:
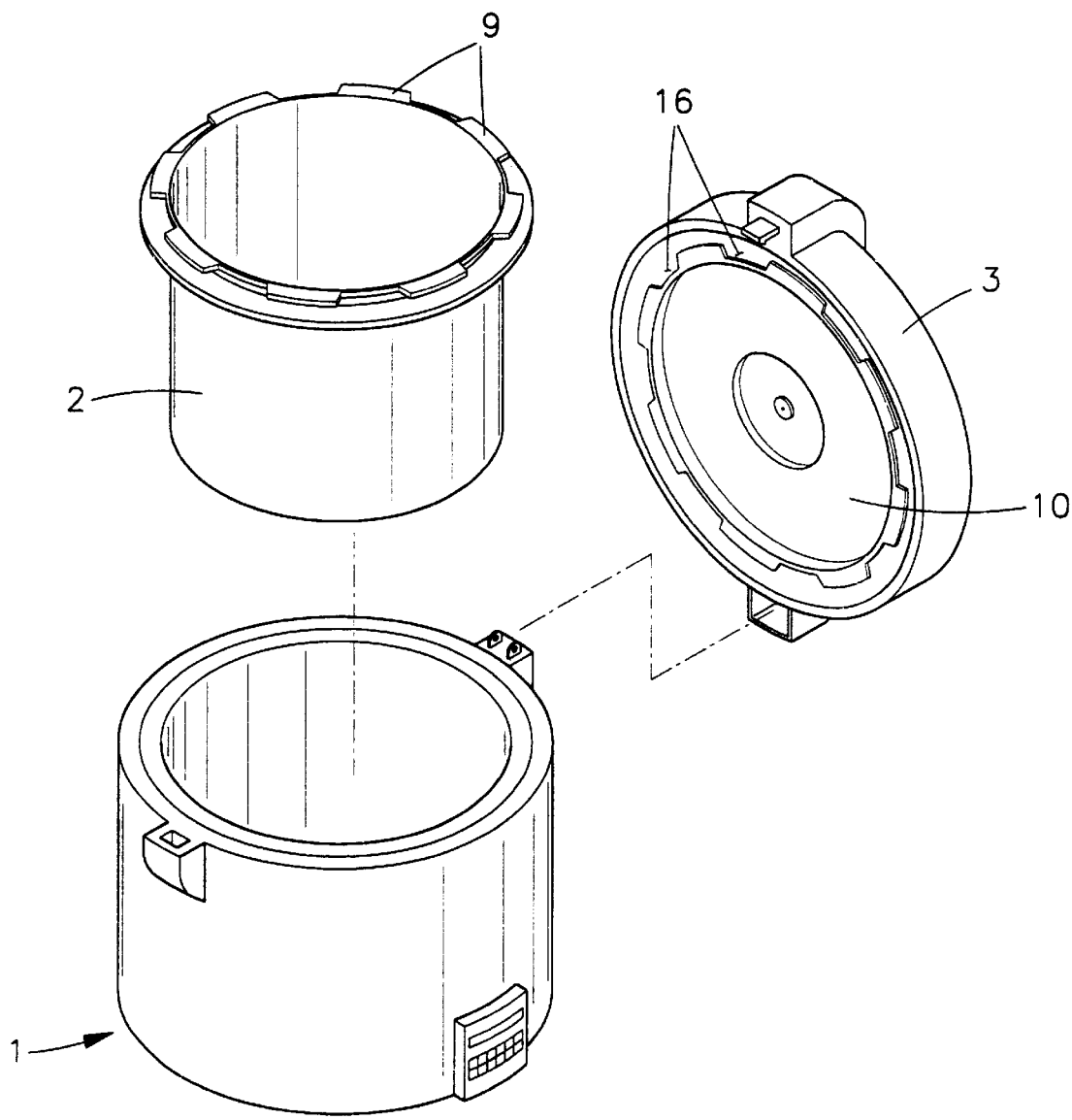
FIG. 23 is an exploded perspective view partially illustrating a conventional electric pressure cooker.

FIG. 21A shows the engaging piece 222*a* of the engaging member 220 when it is not locking the rim 132 of the food container 130 and the auxiliary lid 150;

FIG. 21B shows the engaging piece of the engaging member 220 locking the rim 132 of the food container 130 and the auxiliary lid 150; and FIG. 21C shows the engaging piece 222 broken by excessive pressure in the food container 130 caused by the malfunction of the vapor discharge device. a state in which the inside of the food container 130 has a high pressure by a malfunction of the vapor discharging device and thereby the connecting pieces 222*b* is broken.

The hook 221 does not lock the contact portion between the food container 130 and the auxiliary lid 150 before the cooking operation starts, as shown in FIG. 21A. But, when the cooking operation starts, the hook 221 locks the food container 130 and the auxiliary lid 150, as shown in FIG. 21B. Thereafter, when the pressure in the food container 130, when it is over a predetermined pressure, slightly raises the auxiliary lid 150. If the pressure in the food container 130, due to a malfunction of the vapor discharge device, continues to increase, the auxiliary lid 150 continues to be raised as the connecting pieces 222*b* bend. At this time, if a pressure higher than a predetermined level is applied to the connecting pieces 222*b*, the connecting pieces 222*b* are broken as shown in FIG. 21C. Accordingly, the engaging piece 222*a* moves down and lies upon the hook 221. This increases the effective height of the hook 221 so the auxiliary lid 150 can raised higher the volume of the food container 130. In addition, one end of the sealing member 160 becomes positioned at the gap D1 between the rim 132 and the auxiliary lid 150, allowing the discharge of excess vapor.

The aforementioned second safety means can be used in conjunction with the first safety means formed on the sealing member 160. In this case, the vapor is discharged through the vapor discharging device when the inside of the food container 130 is beyond the predetermined pressure. If the the pressure in the food container 130 surpasses this predetermined pressure due to the malfunction of the vapor discharging device, the vapor is discharged through the first safety means formed on the sealing member 160 and is dissipated by the bending of the connecting pieces 2222*b*. If the pressure in the food container 130 still continues to increase and reaches a second predetermined pressure due to malfunctions of the vapor discharging device and the first safety means, the vapor is discharged through the second safety means, wherein the connecting pieces 222*b* are broken.

The aforementioned safety means according to the present invention seal the food container 130, and increase the inner pressure of the food container 130, and are thereby used in all pressure apparatus.

As described above, the electric pressure cooker according to the present invention automatically locks the food container 130 and the auxiliary lid by using the motor 180, thereby enhancing the user's convenience.

In addition, the present invention senses whether the food containerand the auxiliary are locked or released to accurately control the motor. Accordingly, since the additional power is not used, the present invention is economical.

Even if there is a malfunction in the motor, the lid (i.e., the auxiliary lid) can be manually opened, so the user can use the electric pressure cooker with a sense of security.

Since the user can check the inner pressure state of the food containerfrom the outside, the user can judge whether a cooking operation is being performed normally.

When the pressure in the cooker exceeds a predetermined pressure, the vapor is automatically discharged through the groove in the sealing member or the discharge hole, so the present invention is free from danger.

If the pressure in the electric pressure cooker continues to increae to an extreme, the connecting pieces are broken. As a result, the pressure in the food containerdescreases because the inner volume of the cooker enlarges, thereby ensuring the safety of the user.

What is claimed is:

1. An electric pressure cooker, comprising:
   a cooker body with a food container;
   a lid for opening/closing said container;
   locking means which locks or releases said lid with said container; and
   driving means for driving said locking means.

2. The electric pressure cooker as set forth in claim 1, further comprising:
   a motor mounted to said driving means;
   an engaging member which has a hook and performs a rectilinear reciprocating motion, mounted to said locking means; and
   movement-shifting means for converting a rotation of said motor into a rectilinear motion of said engaging member.

3. The electric pressure cooker as set forth in claim 2, wherein:
   said food container has an outward-extending rim covered by an auxiliary lid that is connected to said lid; and
   said hook is bended to lock a contact portion between said rim and said auxiliary lid.

4. The electric pressure cooker as set forth in claim 2, wherein said movement-shifting means comprises:
   a rotating member rotated by said motor;
   a guide route which has a first region which is separated from a rotating center of said rotating member by a constant distance, has a second region which is further separated from said rotating center than said first region, and connects said first region more separated from said rotating center to said second region; and
   a connecting bar which is mounted to said engaging member and has one end inserted into said guide route.

5. The electric pressure cooker as set forth in claim 2, wherein said movement-shifting means:
   a rotating member rotated by said motor;
   guide routes which have a first region which is separated from a rotating center of said rotating member by a constant distance, have a second region which is more separated from said rotating center than said first region, and connect said first region to said second region;
   a connecting bar which is mounted to said engaging member, and has one end inserted into said guide route; and
   said guide routes made by one pair holding either said first region or said second region, the number of guide routes making pairs corresponds to the number of said engaging members.

6. The electric pressure cooker as set forth in claim 5, wherein said guide routes are connected to one another.

7. The electric pressure cooker as set forth in claim 3, wherein:
   said motor is mounted to a top of said auxiliary lid; and
   said rotating member is positioned on said motor.

8. The electric pressure cooker as set forth in claim 7, wherein a heat-insulating member is mounted between said auxiliary lid and said motor.

9. The electric pressure cooker as set forth in claim 3, wherein:
   said motor is mounted to a top of said auxiliary lid; and
   said motor is positioned on said rotating member.

10. The electric pressure cooker as set forth in claim 3, wherein a guide for guiding a rectilinear reciprocating motion of said engaging member is mounted on said auxiliary lid.

11. The electric pressure cooker as set forth in claim 3, wherein a rail for reducing a frictional resistance between said engaging member and said auxiliary lid is provided to said auxiliary lid.

12. The electric pressure cooker as set forth in claim 3, wherein a bushing for reducing a frictional resistance between said connecting bar and said rotating member is provided to said connecting bar.

13. The electric pressure cooker as set forth in claim 1, further comprising:
   sensing means for sensing whether said lid and said food container are locked or released.

14. The electric pressure cooker as set forth in claim 3, wherein said sensing means comprises:
   a magnet provided on said engaging member that moves together with said engaging member; and
   two switches which are separated from each other by a predetermined gap in order to sense whether said engaging member has locked or released said food container and said auxiliary lid by the interaction between said two switches and said magnet.

15. The electric pressure cooker as set forth in claim 1, further comprising:
   manual rotating means through which said rotating member can be rotated.

16. The electric pressure cooker as set forth in claim 15, wherein said manual rotating means comprises:
   teeth formed on the pheriphery of said rotating means; and
   a rotating lever which is engaged with said teeth of said rotating member, and can be rotated by a manual operation.

17. The electric pressure cooker as set forth in claim 16, wherein said teeth are formed on only half of--he circumference of said manual rotating means so as to prevent the rotation of said rotating member when driving said motor.

18. The electric pressure cooker as set forth in claim 16, wherein said lid includes an opening for manually operating said rotating lever, and said opening has a display window for opening/closing said opening.

19. An electric pressure cooker, comprising:

a food container;

a lid for opening/closing said container;

an auxiliary lid which is mounted to said lid and is able to be slightly raised by the pressure in said container; and a pressure display means which is raised together with said auxiliary lid, and allows the user to monitor the pressure level in said inner pressure state of said food container from the outside.

20. The electric pressure cooker as set forth in claim 19, wherein:

said lid has an opening connected to outside; and said pressure display means has a projecting bar which is mounted to said auxiliary lid and is projected to the outside of said lid through said opening by the raising of said auxiliary lid.

21. The electric pressure cooker as set forth in claim 20, wherein said opening includes a display window covering said opening which is opened by said projecting bar when said projecting bar raises up, or is closed by said opening when said projecting bar lowers down.

22. An electric pressure cooker, comprising:

a food container;

a lid for opening/closing said container;

a sealing member which is mounted to said lid and contacts said container, thereby preventing the leakage of vapor; and a safety means which is mounted to said sealing member that discharges vapor when the inner pressure in said food container exceeds a predetermined pressure.

23. The electric pressure cooker as set forth in claim 22, wherein said safety means includes:

a groove formed in said sealing member so as to provide an outlet for vapor discharge through a gap between said sealing member and said food container when a vapor pressure in the food container exceeds a predetermined pressure.

24. The electric pressure cooker as set forth in claim 22, wherein:

said lid has an auxiliary lid to be elevated; and said safety means has a discharge hole which contacts an inner surface of said food containerin a normal state but is formed to said sealing member in order to be positioned between said auxiliary lid elevated by said vapor pressure and said food container when said vapor pressure higher than said constant pressure is operated.

25. The electric pressure cooker as set forth in claim 22, wherein:

said lid has an auxiliary lid to be elevated; and said safety means has a groove formed in said sealing member and contacts an inner surface of said food containerin a normal state, but at least an upper end of said groove is positioned between said auxiliary lid elevated by said vapor pressure and said food container when said vapor pressure higher than said constant pressure is operated, and a lower end of said groove is connected to said container.

26. The electric pressure cooker as set forth in claims 22 to 25, further comprising:

a vapor discharging device which discharges excess vapor generated during cooking in order to maintain a predetermined pressure in said container.

27. An electric pressure cooker, comprising:

a container;

a lid for opening/closing the container;

an auxiliary lid which is mounted to said lid;

a sealing member which is mounted to said auxiliary lid contacted with said container, thereby preventing a leakage of vapor during cooking;

an engaging member which locks a contact portion between said auxiliary lid and said container, and is elevated together with said auxiliary lid;

a vapor discharge means which discharges vapor so as to maintain a predetermined pressure in the inside of said food containerby said vapor generated when cooking; and safety means which is provided to said engaging means, prevents said auxiliary lid from elevating when an inner pressure in said food containeris between a first pressure higher than said predetermined pressure and a second pressure, elevates said auxiliary lid when said inner pressure of said food containeris higher than said second pressure, and discharges vapor through a gap between said food containerand said auxiliary lid simultaneously with enlarging an inner volume of said container.

28. The electric pressure cooker as set forth in claim 27, wherein:

said engaging member has a bent hook for locking a contact portion between said food containerand said auxiliary lid; and said safety means includes: engaging pieces which are provided to said hook and contact said container: and connecting pieces which connect said engaging piece to said hook, is broken when said auxiliary lid is elevated more than a predetermined height, and positions one end of said sealing member to a gap between said food containerand said auxiliary lid.

* * * * *